United States Patent
Hong et al.

(10) Patent No.: US 9,645,934 B2
(45) Date of Patent: May 9, 2017

(54) SYSTEM-ON-CHIP AND ADDRESS TRANSLATION METHOD THEREOF USING A TRANSLATION LOOKASIDE BUFFER AND A PREFETCH BUFFER

(71) Applicant: Samsung Electronics Co., Ltd., Suwon-si (KR)

(72) Inventors: Sung-Min Hong, Suwon-si (KR); Sim Ji Lee, Seoul (KR); JaeYoung Hur, Hwaseong-si (KR); JiWoong Kwon, Hwaseong-si (KR); Il Park, Hwaseong-si (KR); Jong-Jin Lee, Suwon-si (KR); Jinyong Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 68 days.

(21) Appl. No.: 14/462,774

(22) Filed: Aug. 19, 2014

(65) Prior Publication Data
US 2015/0082000 A1      Mar. 19, 2015

Related U.S. Application Data

(60) Provisional application No. 61/877,471, filed on Sep. 13, 2013, provisional application No. 61/898,079, filed on Oct. 31, 2013.

(51) Int. Cl.
G06F 12/10 (2016.01)
G06F 12/08 (2016.01)
(Continued)

(52) U.S. Cl.
CPC ...... *G06F 12/0862* (2013.01); *G06F 12/1009* (2013.01); *G06F 12/1027* (2013.01);
(Continued)

(58) Field of Classification Search
CPC ............ G06F 12/1036; G06F 12/1009; G06F 12/0862; G06F 2212/654; G06F 2212/507;
(Continued)

(56) References Cited

U.S. PATENT DOCUMENTS 6,175,898 B1 *   1/2001   Ahmed .................... G06F 9/383
                                                                    711/137
7,386,679 B2    6/2008   Franaszek et al.
(Continued)

FOREIGN PATENT DOCUMENTS

| FR | EP 1139222 A1 * | 10/2001 | ......... G06F 9/30043 |
| JP | 2001290706 | 10/2001 | |
| KR | 2010005539 | 1/2010 | |

*Primary Examiner* — Mark Giardino, Jr.
*Assistant Examiner* — Glenn Gossage
(74) *Attorney, Agent, or Firm* — Onello & Mello, LLP

(57) ABSTRACT

A page descriptor can be stored in advance in a memory management unit under various conditions so that an address translation overhead can be reduced. The memory management unit comprises an address translation unit that receives a memory access request as a virtual address and translates the virtual address to a physical address. A translation lookaside buffer (TLB) stores page descriptors of a plurality of physical addresses, the address translation unit determining whether a page descriptor corresponding to a received virtual address is present in the translation lookaside buffer. A prefetch buffer stores page descriptors of the plurality of physical addresses. The address translation unit, in the event the page descriptor corresponding to the received virtual address is not present in the translation lookaside buffer, further determines whether the page descriptor corresponding to the received virtual address is present in the prefetch buffer; updates the translation lookaside buffer with the page descriptor corresponding to the received virtual address; and performs a translation of the virtual address to a physical (Continued)

address using the page descriptor corresponding to the received virtual address. The prefetch buffer may include sub-prefetch buffers, and may be updated based on access direction information.

19 Claims, 25 Drawing Sheets

(51) Int. Cl.
  *G06F 12/0862* (2016.01)
  *G06F 12/1009* (2016.01)
  *G06F 12/1027* (2016.01)

(52) U.S. Cl.
  CPC ............... *G06F 2212/507* (2013.01); *G06F 2212/6022* (2013.01); *G06F 2212/654* (2013.01); *G06F 2212/68* (2013.01); *G06F 2212/681* (2013.01)

(58) Field of Classification Search
  CPC ......... G06F 2212/68; G06F 2212/6022; G06F 12/1027; G06F 2212/681
  See application file for complete search history.

(56) References Cited

U.S. PATENT DOCUMENTS

| | | |
|---|---|---|
| 7,480,769 B2 | 1/2009 | Diefendorff et al. |
| 7,620,749 B2 | 11/2009 | Biran et al. |
| 7,783,837 B2 | 8/2010 | Franaszek et al. |
| 7,793,067 B2 | 9/2010 | Kegel et al. |
| 7,797,494 B2 | 9/2010 | Kimura |
| 7,958,315 B2 | 6/2011 | Anand et al. |
| 7,984,203 B2 | 7/2011 | Madukkarumukumana et al. |
| 8,024,547 B2 | 9/2011 | Lee et al. |
| 8,032,723 B2 | 10/2011 | Sechrest et al. |
| 8,078,806 B2 | 12/2011 | Diefendorff |
| 8,244,978 B2 | 8/2012 | Kegel et al. |
| 8,296,538 B2 | 10/2012 | Grisenthwaite |
| 8,341,379 B2 | 12/2012 | Pan et al. |
| 8,397,049 B2 | 3/2013 | Wang et al. |
| 8,405,668 B2 | 3/2013 | Bratt et al. |
| 2005/0182904 A1* | 8/2005 | So ....................... G06F 12/0862 711/137 |
| 2006/0026365 A1* | 2/2006 | Yamazaki ........... G06F 9/30047 711/137 |
| 2006/0053256 A1* | 3/2006 | Moyer ................. G06F 12/0215 711/137 |
| 2007/0204129 A1* | 8/2007 | Nishino .............. G06F 12/1036 711/202 |
| 2007/0226422 A1* | 9/2007 | Mino ................... G06F 12/0862 711/137 |
| 2009/0006754 A1* | 1/2009 | Luick .................. G06F 12/1063 711/122 |
| 2009/0006803 A1* | 1/2009 | Luick .................. G06F 12/1045 711/202 |
| 2009/0327647 A1* | 12/2009 | Ingle .................... G06F 12/1027 711/207 |
| 2010/0199063 A1* | 8/2010 | Sechrest ............... G06F 12/122 711/204 |
| 2010/0332790 A1* | 12/2010 | Maruyama .......... G06F 12/1027 711/207 |
| 2011/0010521 A1* | 1/2011 | Wang .................. G06F 12/1027 711/207 |
| 2011/0271075 A1* | 11/2011 | Ahn ........................ G06F 12/10 711/206 |
| 2011/0296136 A1* | 12/2011 | O'Connor ............. G06F 12/126 711/207 |
| 2012/0079232 A1* | 3/2012 | Hinton ................ G06F 12/0292 711/207 |
| 2012/0079303 A1* | 3/2012 | Madduri ............... G06F 1/3203 713/324 |
| 2012/0226888 A1* | 9/2012 | Rychlik ............. G06F 12/1027 711/207 |
| 2012/0290813 A1* | 11/2012 | Kong .................. G06F 12/1009 711/206 |
| 2012/0297139 A1* | 11/2012 | Choi ................... G06F 12/1009 711/122 |
| 2014/0108766 A1* | 4/2014 | Desai .................. G06F 12/1027 711/205 |
| 2015/0058578 A1* | 2/2015 | Ries ..................... G06F 12/0862 711/137 |

\* cited by examiner

SYSTEM-ON-CHIP AND ADDRESS TRANSLATION METHOD THEREOF USING A TRANSLATION LOOKASIDE BUFFER AND A PREFETCH BUFFER

CROSS-REFERENCE TO RELATED APPLICATIONS

This U.S. non-provisional patent application claims priority under 35 U.S.C. §119 of U.S. Provisional Patent Application Ser. No. 61/877,471 filed on Sep. 13, 2013, and U.S. Provisional Patent Application Ser. No. 61/898,079 filed on Oct. 31, 2013, the entire contents of which are hereby incorporated by reference.

BACKGROUND

Embodiments of the present disclosure relate to semiconductor devices and, more particularly, to system-on-chip devices that utilize a virtual memory configuration, and further relate to an address translation method thereof.

Mobile devices such as smartphones, tablet personal computers (PCs), digital cameras, MPEG-3 (MP3) players, and personal digital assistants (PDAs) continue to enjoy widespread use. "Application processors", as they are referred to, have been employed as the driving processor for such mobile devices. Virtual memory management configurations have been employed for improving memory use efficiency in application processors, which commonly include modules or circuit functions referred to as intellectual properties (IPs). In a virtual memory management scheme, IPs access a memory device using a virtual address.

A memory management unit (hereinafter referred to as "MMU") is hardware responsible for translating a virtual address (hereinafter referred to as "VA") to a physical address (hereinafter referred to as "PA") of a memory device. The MMU fetches address translation information, for example page descriptor information, from the memory to translate an input VA to a PA. In addition, the MMU may translate the VA to the PA with reference to a page descriptor to access a memory device.

If a page descriptor corresponding to an access-requested virtual address is already present in an MMU when address translation is performed, additional memory access is not required. Thus, an address translation operation may be promptly carried out. However, in a case where the page descriptor corresponding to the access-requested virtual address is not present in the MMU, an access operation of the memory device is required to occur twice. Accordingly, an address translation overhead is incurred. Since such latency operates as a decisive factor for overall system performance, minimization of address translation overhead is desired.

SUMMARY

In an aspect, a memory management unit comprises: an address translation unit that receives a memory access request as a virtual address and translates the virtual address to a physical address; a translation lookaside buffer that stores page descriptors of a plurality of physical addresses, the address translation unit determining whether a page descriptor of a received virtual address is present in the translation lookaside buffer; and a prefetch buffer that stores page descriptors of the plurality of physical addresses, wherein the address translation unit, in the event the page descriptor of the received virtual address is not present in the translation lookaside buffer, further: determines whether the page descriptor of the received virtual address is present in the prefetch buffer updates the translation lookaside buffer with the page descriptor in response to the determination; and performs a translation of the virtual address to a physical address using the page descriptor.

In some embodiments, the address translation unit further performs a prefetch operation from a memory device in communication with the memory management unit for the page descriptor of the virtual address determined to be not present in the prefetch buffer.

In some embodiments, the prefetch operation is performed in response to access direction information received from a processing unit in communication with the memory management unit.

In some embodiments, the prefetch operation is performed in response to access direction information received from a Hardware IP unit in communication with the memory management unit.

In some embodiments, the prefetch operation is performed in response to a fetch request received from a processing unit in communication with the memory management unit, the fetch request including at least one of a page descriptor of the virtual address or the virtual address.

In some embodiments, the prefetch operation is performed in response to a fetch request received from a Hardware IP unit in communication with the memory management unit the fetch request including at least one of a page descriptor of the virtual address or the virtual address.

In some embodiments, the memory management unit further comprises a direct buffer that stores page descriptors of a plurality of physical addresses, wherein the address translation unit further receives a direct fetch request command, and in response, fetches at least one page descriptor associated with a received virtual address and stores the page descriptor in the direct buffer.

In some embodiments, the direct fetch request is received from a Hardware IP unit in communication with the memory management unit.

In some embodiments, the direct fetch request is received from a processing unit in communication with the memory management unit.

In some embodiments, the direct fetch request command is received and processed prior to the memory access request.

In some embodiments, the address translation unit, after storing the page descriptor in the direct buffer, transmits a completion command to a unit that issued the direct fetch request command.

In some embodiments, the address translation unit, upon determining that the page descriptor of the received virtual address is not present in the prefetch buffer, further determines whether the page descriptor of the received virtual address is present in the direct buffer.

In some embodiments, updating the translation lookaside buffer with the page descriptor in response to the determination is performed in response to a temporal locality of the page descriptor.

In some embodiments, updating the translation lookaside buffer with the page descriptor in response to the determination is performed in response to a spatial locality of the page descriptor.

In an aspect, a system on a chip comprises: a processing unit; a hardware IP unit that issues memory access requests as virtual addresses; a memory device; a memory management unit in communication with the processing unit, the hardware IP unit and the memory device comprising: an address translation unit that receives a memory access request from the hardware IP unit as a virtual address and translates the virtual address to a physical address; a translation lookaside buffer that stores page descriptors of a plurality of physical addresses, the address translation unit determining whether a page descriptor of a received virtual address is present in the translation lookaside buffer; and a prefetch buffer that stores page descriptors of the plurality of physical addresses, wherein the address translation unit, in the event the page descriptor of the received virtual address is not present in the translation lookaside buffer, further: determines whether the page descriptor of the received virtual address is present in the prefetch buffer; performs a prefetch operation from the memory device for the page descriptor of the virtual address determined to be not present in the prefetch buffer in response to access direction information received from at least one of the processing unit or the hardware IP unit; and performs a translation of the virtual address to a physical address using the page descriptor.

In some embodiments, the address translation unit further updates the translation lookaside buffer with the page descriptor in response to the determination;

In some embodiments, the prefetch operation is performed in response to a fetch request received from the processing unit, the fetch request including at least one of a page descriptor of the virtual address or the virtual address.

In some embodiments, the prefetch operation is performed in response to a fetch request received from the Hardware IP unit the fetch request including at least one of a page descriptor of the virtual address or the virtual address.

In some embodiments, the system on a chip further comprises a direct buffer that stores page descriptors of a plurality of physical addresses, wherein the address translation unit further receives a direct fetch request command, and in response, fetches at least one page descriptor associated with a received virtual address and stores the page descriptor in the direct buffer.

In some embodiments, the direct fetch request is received from a Hardware IP unit in communication with the memory management unit.

In some embodiments, the direct fetch request is received from a processing unit in communication with the memory management unit.

In some embodiments, the direct fetch request command is received and processed prior to the memory access request.

In some embodiments, the address translation unit, after storing the page descriptor in the direct buffer, transmits a completion command to a unit that issued the direct fetch request command.

In some embodiments, the address translation unit, upon determining that the page descriptor of the received virtual address is not present in the translation prefetch buffer, further determines whether the page descriptor of the received virtual address is present in the direct buffer.

In an aspect, a method of operating a memory management unit, the memory management unit in communication with at least one of a processing unit or a hardware IP unit, and in communication with a memory device, comprises: receiving prefetch buffer matching information (PBMI) from at least one of the processing unit or the hardware IP unit; storing the PBMI at a control register on the memory management unit; receiving a memory access request from the hardware IP unit, the memory access request including input matching information and a virtual address; comparing the PBMI to the input matching information of the memory access request; in the event the comparing results in a match, retrieving a page descriptor of the received virtual address from a prefetch buffer on the memory management unit; in the event the comparing results in no match, retrieving a page descriptor of the received virtual address from the memory device; and translating the received virtual address to a physical address using the retrieved page descriptor.

In some embodiments, the PBMI comprises a virtual address

In some embodiments, the PBMI comprises an identification of a data traffic thread.

In some embodiments, the PBMI comprises a control signal set by a user.

In some embodiments, the input matching information comprises access direction information received from the processing unit.

In some embodiments, the input matching information comprises access direction information received from the hardware IP unit.

In some embodiments, the input matching information comprises a fetch request received from the processing unit.

In some embodiments, the input matching information comprises a fetch request received from the hardware IP unit.

In an aspect, a method of translating a virtual address to a physical address in a memory management unit comprises: receiving a memory access request as a virtual address; determining whether a page descriptor of a received virtual address is present in a translation lookaside buffer, the translation lookaside buffer having stored therein page descriptors of a plurality of physical addresses; and in the event the page descriptor of the received virtual address is not present in the translation lookaside buffer, further: determining whether the page descriptor of the received virtual address is present in a prefetch buffer, the prefetch buffer on the memory management unit and having stored therein page descriptors of a plurality of physical addresses; updating the translation lookaside buffer with the page descriptor in response to the determination; and performing a translation of the virtual address to a physical address using the page descriptor.

In some embodiments, the method further comprises performing a prefetch operation from a memory device in communication with the memory management unit for the page descriptor of the virtual address determined to be not present in the prefetch buffer.

In some embodiments, the prefetch operation is performed in response to access direction information received from a processing unit in communication with the memory management unit.

In some embodiments, the prefetch operation is performed in response to access direction information received from a Hardware IP unit in communication with the memory management unit.

In some embodiments, the prefetch operation is performed in response to a fetch request received from a processing unit in communication with the memory management unit, the fetch request including at least one of a page descriptor of the virtual address or the virtual address.

In some embodiments, the prefetch operation is performed in response to a fetch request received from a Hardware IP unit in communication with the memory management unit the fetch request including at least one of a page descriptor of the virtual address or the virtual address.

In some embodiments, the memory management unit further comprises storing page descriptors of a plurality of physical addresses in a direct buffer, wherein, in response to receiving a direct fetch request command, fetching at least one page descriptor associated with a received virtual address and stores the page descriptor in the direct buffer.

In some embodiments, the direct fetch request is received from a Hardware IP unit in communication with the memory management unit.

In some embodiments, the direct fetch request is received from a processing unit in communication with the memory management unit.

In some embodiments, the direct fetch request command is received and processed prior to the memory access request.

In some embodiments, after storing the page descriptor in the direct buffer, the method further comprises transmitting a completion command to a unit that issued the direct fetch request command.

In some embodiments, the method further comprises, upon determining that the page descriptor of the received virtual address is not present in the prefetch buffer, determining whether the page descriptor of the received virtual address is present in the direct buffer.

In some embodiments, updating the translation lookaside buffer with the page descriptor in response to the determination is performed in response to a temporal locality of the page descriptor.

In some embodiments, updating the translation lookaside buffer with the page descriptor in response to the determination is performed in response to a spatial locality of the page descriptor.

In an aspect, a mobile device comprises: a memory system comprising a memory management unit comprising: an address translation unit that receives a memory access request as a virtual address and translates the virtual address to a physical address; a translation lookaside buffer that stores page descriptors of a plurality of physical addresses, the address translation unit determining whether a page descriptor of a received virtual address is present in the translation lookaside buffer; and a prefetch buffer that stores page descriptors of the plurality of physical addresses, wherein the address translation unit, in the event the page descriptor of the received virtual address is not present in the translation lookaside buffer, further: determines whether the page descriptor of the received virtual address is present in the prefetch buffer; updates the translation lookaside buffer with the page descriptor in response to the determination; and performs a translation of the virtual address to a physical address using the page descriptor; an input device at which a user provides user input to the memory system; and a display that provides information output by the memory system.

In some embodiments, the mobile device further comprises a mobile power source.

In some embodiments, the memory system comprises a system-on-a-chip.

In an aspect, a method of translating a virtual address to a physical address in a memory management unit comprises: receiving a memory access request as a virtual address; determining whether a page descriptor corresponding to the virtual address is present in a translation lookaside buffer, the translation lookaside buffer having stored therein page descriptors of a plurality of physical addresses; and in the event the page descriptor corresponding to the virtual address is not present in the translation lookaside buffer, further: determining whether the page descriptor corresponding to the virtual address is present in a prefetch buffer, the prefetch buffer on the memory management unit and having stored therein page descriptors of a plurality of physical addresses; and in the event the page descriptor corresponding to the virtual address is not present in the prefetch buffer, further updating the prefetch buffer with the page descriptor corresponding to the virtual address in an external memory; performing a translation of the virtual address to a physical address using the page descriptor; and updating the translation lookaside buffer with the page descriptor in response to the determination.

In some embodiments, the prefetch buffer comprises first and second sub-prefetch buffers, and wherein an access of one of the first and second prefetch buffers occurs while an update of another of the first and second prefetch buffers is performed.

In some embodiments, determining whether the page descriptor corresponding to the virtual address is present in a prefetch buffer is performed by: receiving prefetch buffer matching information (PBMI); storing the PBMI at a control register on the memory management unit; receiving a memory access request, the memory access request including input matching information and a virtual address; comparing the PBMI to the input matching information of the memory access request; in the event the comparing results in a match, retrieving a page descriptor of the received virtual address from a prefetch buffer on the memory management unit; in the event the comparing results in no match, retrieving a page descriptor of the received virtual address from the memory device; and translating the received virtual address to a physical address using the retrieved page descriptor.

In some embodiments, receiving a memory access request comprises receiving a memory access request from one of a plurality of memory access traffic threads.

In some embodiments, the control register comprises multiple control registers and wherein the prefetch buffer comprises multiple prefetch buffers and comparing the PBMI to the input matching information of the memory access request comprises comparing the input information to the multiple control registers to determine which of the multiple prefetch buffers to access.

In some embodiments, the multiple prefetch buffers are bundled into logic units which units can be accessed for access requests corresponding to different access traffic rates.

In some embodiments, the method further comprises locking a page descriptor corresponding to a predefined process in the translation lookaside buffer.

In some embodiments, the predefined process comprises a software direct fetch request (SDF).

In some embodiments, the method further comprises, in the event the page descriptor corresponding to the virtual address is not present in the prefetch buffer, performing a block fetch to update the prefetch buffer In some embodiments, the method further comprises, in the event the page descriptor corresponding to the virtual address is not present in the prefetch buffer, performing a fetch to retrieve page descriptors of a sub-block expected to be next in order.

In some embodiments, the method further comprises, in the event the page descriptor corresponding to the virtual address is not present in the prefetch buffer, performing a fetch to retrieve page descriptors of a sub-block expected to be next in order corresponding to a boundary point of an image and in response to a received hardware direct fetch request (HDF).

In some embodiments, the method further comprises, in the event the page descriptor corresponding to the virtual address is not present in the prefetch buffer, performing a fetch to retrieve page descriptors of a sub-block expected to be next in order corresponding to a frame of an image and in response to a received software direct fetch request (SDF).

In some embodiments, updating the prefetch buffer with the page descriptor further comprises, following updating the prefetch buffer, forwarding a signal indicating completion of the update to a unit that generated the memory access request.

In some embodiments, updating the prefetch buffer comprises updating based on an access direction information received from a processing unit in communication with the memory management unit.

In an aspect, an application processor comprises a processing unit; a hardware IP unit that issues memory access requests as virtual addresses; a memory management unit in communication with the processing unit, the hardware IP unit comprising: an address translation unit that receives a memory access request from the hardware IP unit as a virtual address and translates the virtual address to a physical address; a translation lookaside buffer that stores page descriptors of a plurality of physical addresses, the address translation unit determining whether a page descriptor corresponding to the virtual address is present in the translation lookaside buffer; and a prefetch buffer that stores page descriptors of a plurality of physical addresses, the address translation unit updating the prefetch buffer based on ADI1 and ADI2, wherein ADI1 is a prefetch buffer matching information received from the processing unit; wherein ADI2 is a prefetch buffer matching information received from the hardware IP unit.

In some embodiments, the address translation unit, in the event the page descriptor of the received virtual address is not present in the translation lookaside buffer, further: determines whether the page descriptor of the received virtual address is present in the prefetch buffer; performs a prefetch operation from the memory device for the page descriptor of the virtual address determined to be not present in the prefetch buffer in response to access direction information received from at least one of the processing unit or the hardware IP unit; and performs a translation of the virtual address to a physical address using the page descriptor In some embodiments, the address translation unit further updates the translation lookaside buffer with the page descriptor in response to the determination;

In some embodiments, the prefetch operation is performed in response to a fetch request received from the processing unit, the fetch request including at least one of a page descriptor of the virtual address or the virtual address.

In some embodiments, the prefetch operation is performed in response to a fetch request received from the Hardware IP unit the fetch request including at least one of a page descriptor of the virtual address or the virtual address.

In some embodiments, the application processor further comprises a direct buffer that stores page descriptors of a plurality of physical addresses, wherein the address translation unit further receives a direct fetch request command, and in response, fetches at least one page descriptor associated with a received virtual address and stores the page descriptor in the direct buffer.

In some embodiments, the direct fetch request is received from a Hardware IP unit in communication with the memory management unit.

In some embodiments, the direct fetch request is received from a processing unit in communication with the memory management unit.

In some embodiments, the direct fetch request command is received and processed prior to the memory access request.

In some embodiments, the address translation unit, after storing the page descriptor in the direct buffer, transmits a completion command to a unit that issued the direct fetch request command.

In some embodiments, the address translation unit, upon determining that the page descriptor of the received virtual address is not present in the translation prefetch buffer, further determines whether the page descriptor of the received virtual address is present in the direct buffer.

In an aspect, a system on a chip comprising: a processing unit; a hardware IP unit that issues memory access requests as virtual addresses; a memory device; a memory management unit in communication with the processing unit, the hardware IP unit and the memory device comprising: an address translation unit that receives a memory access request from the hardware IP unit as a virtual address and translates the virtual address to a physical address; a translation lookaside buffer that stores page descriptors of a plurality of physical addresses, the address translation unit determining whether a page descriptor corresponding to the virtual address is present in the translation lookaside buffer; and a prefetch buffer that stores page descriptors of a plurality of physical addresses, the address translation unit updating the prefetch buffer based on first access direction information ADI1 or second access direction information ADI2, wherein ADI1 is a prefetch buffer matching information received from the processing unit; wherein ADI2 is a prefetch buffer matching information received from the hardware IP unit.

In some embodiments, the prefetch buffer is updated in response to a fetch request received from the processing unit in communication with the memory management unit, the fetch request including at least one of a page descriptor of the virtual address or the virtual address.

In some embodiments, the prefetch buffer is updated in response to a fetch request received from the Hardware IP unit in communication with the memory management unit the fetch request including at least one of a page descriptor of the virtual address or the virtual address.

Exemplary embodiments of the inventive concepts provide a system-on-chip accessing a memory in a virtual address mapping manner. In some embodiments, the system-on-chip may include a processing unit configured to execute software loaded to the memory; a hardware intellectual property configured to issue an access request for accessing the memory by generating a virtual address to access the memory; and a memory management unit configured to perform the access request of the hardware intellectual property by translating the virtual address to a physical address. The memory management unit prefetches a page descriptor of a virtual address access-requested by the hardware intellectual property in advance with reference to access direction information provided from the processing unit or the hardware intellectual property.

In other embodiments, the system-on-chip may include a hardware intellectual property configured to issue an access request by generating a virtual address; and a memory management unit configured to perform the access request of the hardware intellectual property by translating the virtual address to a physical address. The memory management unit fetches a page descriptor in an access-expected virtual address area from the memory in advance in response to a hardware fetch request from the hardware intellectual property.

Exemplary embodiments of the inventive concepts provide an address translation method of a system-on-chip accessing a memory in a virtual memory mapping manner. In some embodiments, the address translation method may include providing a first fetch request to a memory management unit to fetch a first page descriptor corresponding to a start address of data unit to be access-requested, from the memory; providing a second prefetch request to the memory management unit to fetch a second page descriptor corresponding to an address where a miss is expected to occur when a page descriptor is prefetched in the page unit according to access direction information; issuing an access request for accessing the data unit; and prefetching a third page descriptor corresponding to an expected address to be access-requested subsequent to the start address according to access direction information. The memory management unit prefetches the third page descriptor with reference to access direction information corresponding to an increased or decreased direction of a continuously access-requested virtual address.

BRIEF DESCRIPTION OF THE DRAWINGS

Embodiments of the inventive concepts will be described herein in more detail with reference to the accompanying drawings. The embodiments of the inventive concepts may, however, be embodied in different forms and should not be construed as limited to the embodiments set forth herein. Rather, these embodiments are provided so that this disclosure will be thorough and complete, and will convey the scope of the inventive concepts to those skilled in the art. Like numbers refer to like elements throughout.

DETAILED DESCRIPTION

Figure 1:
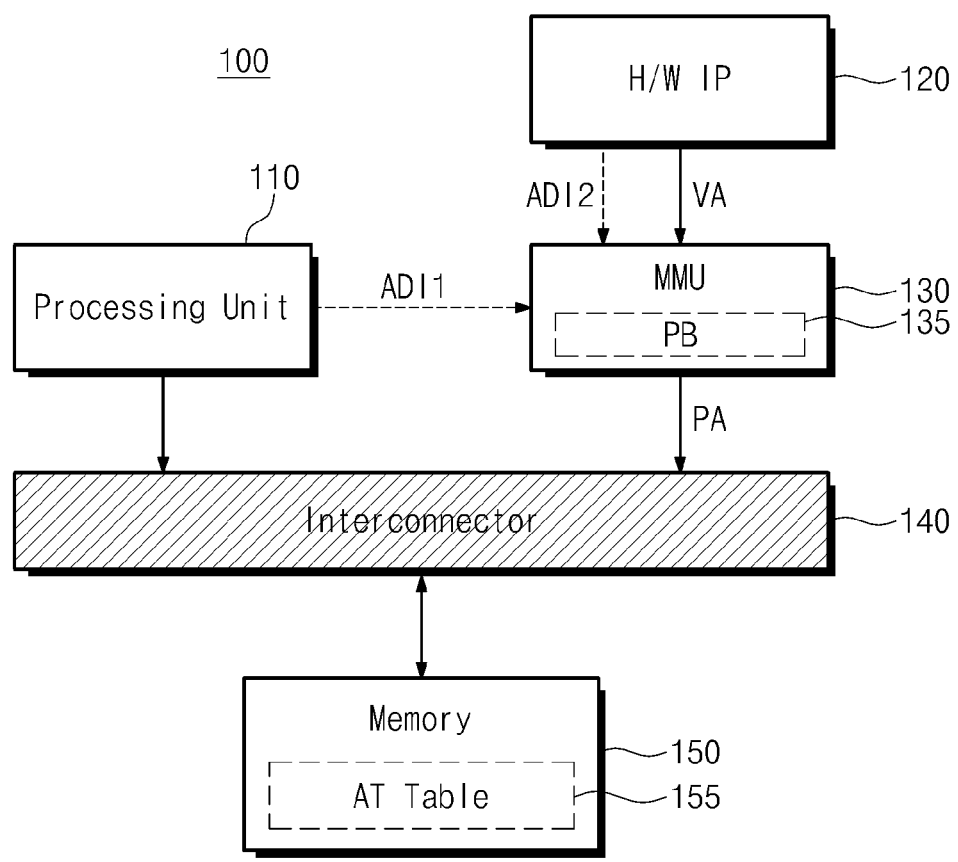
FIG. 1 is a block diagram of a system-on-chip according to an embodiment of the inventive concepts.

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions may be exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts may be described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram of a system-on-chip 100 according to an embodiment of the inventive concepts. As illustrated, the system-on-chip 100 may include a processing unit 110, a hardware intellectual property (H/W IP) 120, a memory management unit (MMU) 130, an interconnector 140, and a memory 150. The memory 150 refers to any of a number of generic-type memory resources such as a dynamic random access memory (DRAM) or a static random access memory (SRAM) provided within, and/or external to, the system-on-chip 100.

The processing unit 110 is constructed and arranged to execute software, for example an application program, an operating system (OS), and/or a device driver, on a mobile device. In addition, the processing unit 110 may be constructed and arranged to be controlled by software such as an application program or an operating system (OS). In some embodiments, the processing unit 110 may be provided as a homogeneous multi-core processor or a heterogeneous multi-core processor, where a multi-core processor is a computing component including processors (hereinafter referred to as "cores") that may be independently driven. Each of the cores may independently read and execute program instructions.

The processing unit 110 may be configured to control the memory management unit 130 according to the control of software, for example, under the control of a device driver. Alternatively, the processing unit 110 may be configured to set an operation mode, an access mode, and an address translation mode of the memory management unit 130 according to the control of software. In certain configurations of the present inventive embodiments, a user may set an address translation operation of the memory management unit 130 in various manners through settings available in the device driver. In particular, the processing unit 110 may provide access direction information ADI1 to the memory management unit 130 with reference to a memory access pattern, in accordance with the present inventive concepts.

The hardware intellectual property 120 refers to a processing block of a system-on-chip which is configured to access the memory 150 through the memory management unit 130. For example, in various embodiments, the hardware intellectual property 120 may comprise at least one of a hardware codec, an image converter, or a liquid crystal display (LCD) controller. In some embodiments, such intellectual property units may frequently access a frame buffer area in the memory 150 to convert or process and reproduce images. An access to the memory 150 is requested by the hardware IP 120 to the memory management unit 130 in the form of a virtual address VA. The function or detailed structure of the hardware intellectual property 120 is not limited to this description, and the present description is merely an example of functionality of the hardware IP. In some embodiments, various intellectual properties and multiple intellectual properties, configured to access the memory 150 to process its contents may be included in the hardware intellectual property 120.

In general, a hardware intellectual property 120 configured to process an image tends to repeatedly process certain segments of data of the image. For example, pixel data may be written into a frame buffer in units of sub-blocks to display a single frame on a screen. At this point, there is repeatability in an address pattern to write the pixel data into the frame buffer. Considering the repeatability or a memory access direction in the frame buffer, address translation overhead may be reduced. In such a case, the hardware intellectual property 120 may provide, to the memory management unit 130, a current access request as well as access direction information ADI2 on a memory area to be accessed.

With reference to the received access direction information ADI1 or ADI2, the memory management unit 130 responds by prefetching a page descriptor of an address expected to be later accessed relative to the virtual address VA that the hardware intellectual property 120 has requested. The memory management unit 130 translates the virtual address VA provided from the hardware intellectual property 120 to a physical address PA of the memory 150. For example, when the virtual address VA indicates an address that is present in a DRAM or an SRAM memory device, the memory management unit 130 responds by mapping the received virtual address to a physical address PA of the corresponding memory device.

In connection with the received access direction information ADI1 or ADI2, the memory management unit 130 may, in response, perform a prefetch operation to prefetch a page descriptor of an access-expected virtual address VA in advance. The memory management unit 130 prefetches and stores a page descriptor of a virtual address VA expected to be accessed at a later time while carrying out an operation for mapping a current access-requested virtual address VA to a physical address PA. In the event that a virtual address VA requested during a subsequent memory access operation and the prefetched page descriptor match each other, the problem of address translation overhead may be sufficiently addressed. The memory management unit 130 may include a prefetch buffer 135 to support the prefetch operation.

In some embodiments, the interconnector 140 provides a memory access path to the processing unit 110 or the hardware intellectual property 120. The processing unit 110 and the hardware intellectual property 120 access the memory 150 through the interconnector 140. In some embodiments, the interconnector 140 provides data, address, and control signal paths through a plurality of channels. For example, the interconnector 140 may comprise an advanced microcontroller bus architecture (AMBA) standard bus type interconnector of the type standardized by ARM Holdings, Ltd. For example, the AMBA standard bus type interconnector may include an advanced high-performance bus (AHB), an advanced peripheral bus (APB), and an advanced extensible interface (AXI). The AXI protocol includes advanced functions such as a multiple outstanding address function and a data interleaving function. However, it will be understood that the interconnector 140 is not limited to the foregoing examples.

Various types of data may be loaded to the memory 150. For example, device drivers for deriving an operating system (OS) or hardware may be loaded to the memory 150. In particular, a frame buffer area can be allocated to the memory 150 to process image data. The memory 150 may include an address translation table (AT Table) 155 for translating a virtual address VA to a physical address PA. The address translation table 155 may include a page descriptor for translating a physical address PA corresponding to the virtual address VA. The page descriptor included in the AT table 155 of the memory 150 may be prefetched by the memory management unit 130 to translate the virtual address VA provided to the memory management unit 130 to the physical address PA.

As described above, the system-on-chip 100 includes the memory management unit 130 that prefetches, in advance, a page descriptor of an access-expected virtual address VA at the time of processing a current access-requested virtual address VA. The memory management unit 130 may receive the access direction information ADI1 or ADI2 corresponding to position information on a page descriptor to be prefetched by the memory management unit 130 from the processing unit 110 or the hardware intellectual property 120.

In a case where access directionality is constant, a prefetch pattern of the memory management unit 130 may be decided according to software or the access direction information ADI1 provided from the processing unit 110. Meanwhile, in a case where access directionality is random, a page descriptor may be prefetched according to the access direction information ADI2 provided from the hardware intellectual property 120. The memory management unit 130 may select a prefetch direction according to access direction information suitable for each situation. If the prefetched page descriptor and the access-requested virtual address VA do not match each other, the memory management unit 130 may operate to fetch a page descriptor using a block fetch operation.

In this manner, a high degree of address translation efficiency may be provided in cases where data having a repeated access characteristic is present, in accordance with a prefetch operation of the page descriptor of the memory management unit 130, as described herein in connection with the present inventive concepts.

Figure 2:
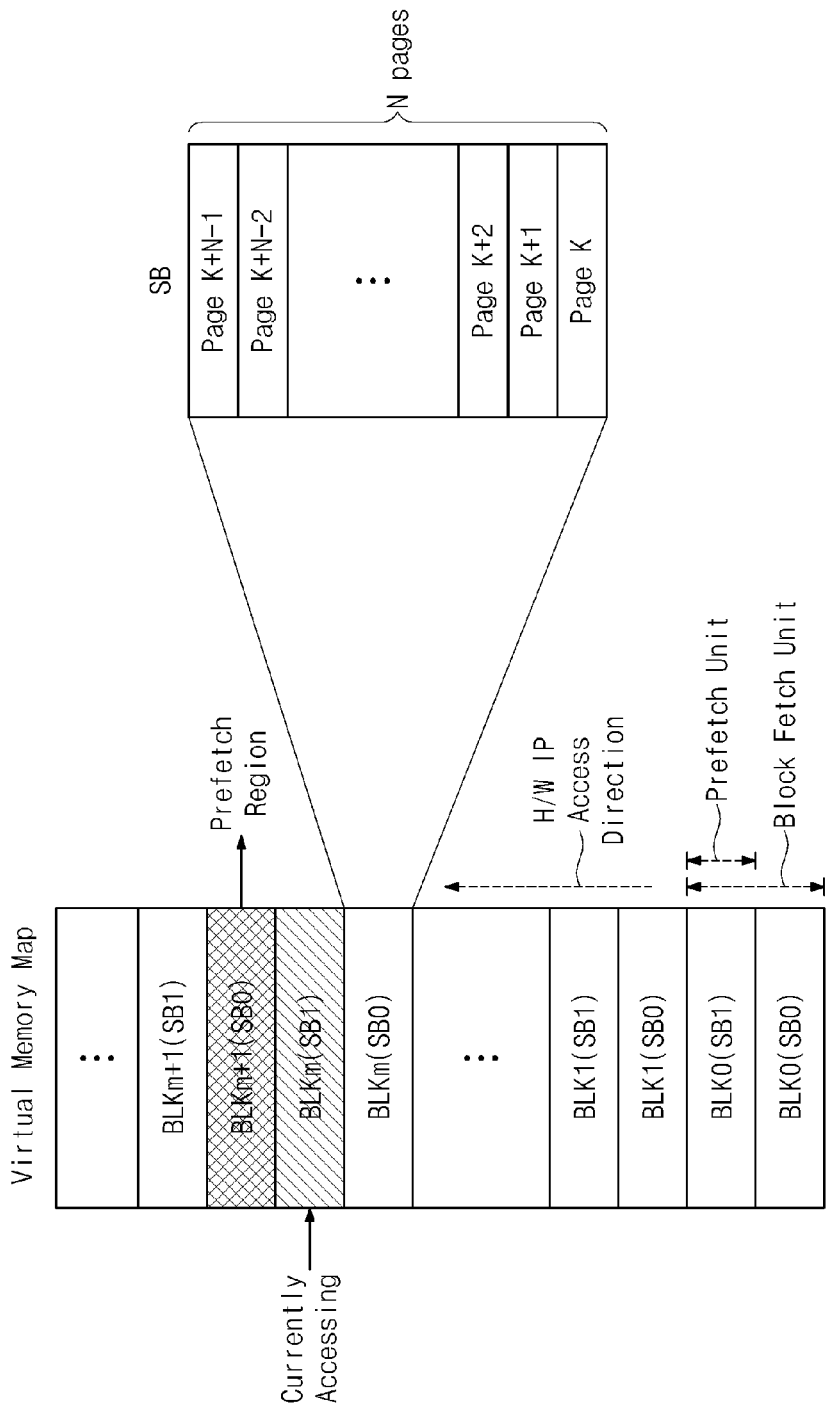
FIG. 2 is a virtual memory map illustrating a prefetch method according to the inventive concepts.

FIG. 2 shows a virtual memory map illustrating a prefetch method according to the inventive concepts. Referring to FIG. 2, the memory 150 (see FIG. 1) may be managed according to a virtual memory map. Let it be assumed that page descriptors corresponding to an address translation table (AT Table) are mapped to the virtual memory map shown in FIG. 2. It will be understood to those of skill in the art, that, although the present example is provided as an illustrative example, other components besides the address translation table, such as a frame buffer, codec buffers, and the like, may also be included in the memory 150.

Let it be assumed that a sub-block SB1 of an $m^{th}$ block BLKm and a sub-block SB0 of an $(m+1)^{th}$ block BLKm+1 are prefetched to the memory management unit 130. In addition, let it be assumed that the access direction information ADI1 or ADI2 is provided by the processing unit 110 or the hardware intellectual property 120 in an address-increasing direction.

In the present example embodiment, the memory management unit 130 prefetches a page descriptor in units of sub-blocks SB. The memory management unit 130 may operate to fetch a plurality of sub-blocks SB at a time when there is no page descriptor corresponding a requested virtual address VA in the memory management unit 130. This type of fetch is referred to as a block fetch. A single sub-block SB(0,1) may include N page units (N being a positive integer). A page is a minimum data size that is managed at a virtual address. For example, in some embodiments, a page may be a unit having a size of 4K bytes. However, it will be understood that a page size may be variously changed, and other page sizes are equally applicable to the principles of the present inventive concepts.

In the present example embodiment, a page descriptor of a currently accessing page BLKm(SB1) in the memory management unit 130 is being fetched and a page descriptor corresponding to an access-expected sub-block BLKm+1 (SB0) is prefetched. Accordingly, in this case, the memory management unit 130 may not perform a prefetch operation on a sub-block. Meanwhile, when the currently accessing page corresponds to the sub-block BLKm+1(SB0), the memory management unit 130 must prefetch the sub-block BLKm+1(SB1). That is, the memory management unit 130 may perform a prefetch operation such that page descriptors corresponding to at least one sub-block size are always included therein.

Figure 4:
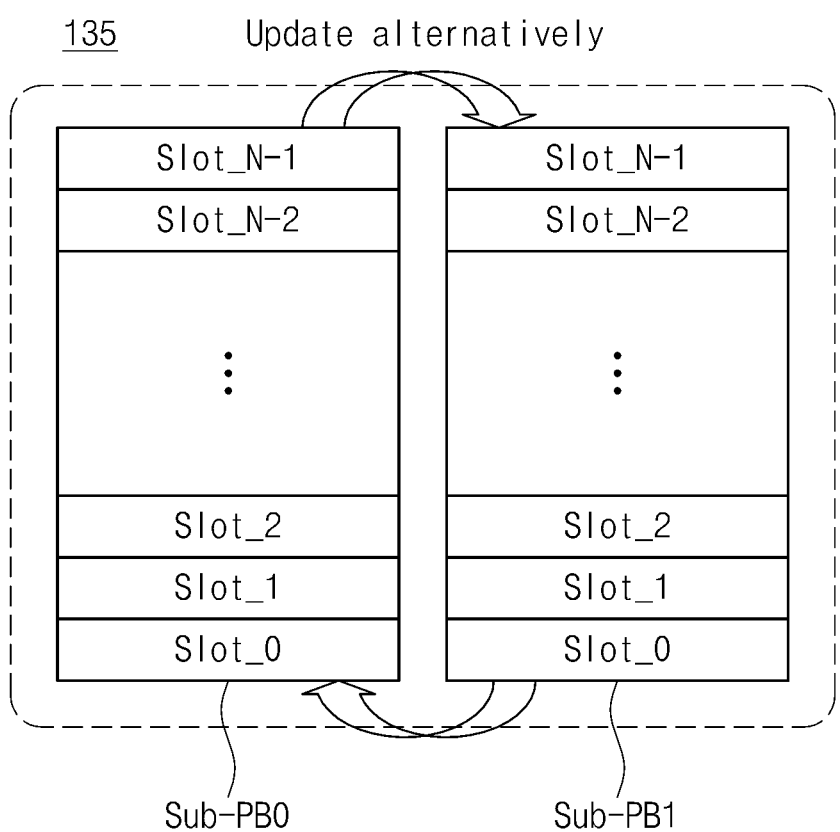
FIG. 4 illustrates a prefetch buffer (PB) including at least two sub-prefetch buffers according to the inventive concepts.

In some embodiments, the prefetch buffer 135 in the memory management unit (MMU) 130 can include at least two sub-prefetch buffers, as shown FIG. 4. In this case, the MMU can use a double-buffering technique for improving utilization of the prefetch buffer 135. In such a double buffering technique, two buffers can be used to retain and manage a block of data. In this manner, the buffer that is not used at a given time can be updated while the other buffer is accessed. In the FIG. 2 example embodiment, the "Block Fetch Unit" and "Prefetch Unit" can be matched in size with those of the prefetch buffer and the sub-prefetch buffer respectively. It can be assumed that the page descriptor ("Currently Accessing") corresponding to a currently requested virtual address VA, is included in BLKm(SB1). If the BLKm(SB0) and BLKm(SB1) data are present in the prefetch buffer, the MMU may update the unused sub-prefetch buffer including the BLKm(SB0) data in an address-increasing direction, or, alternatively in an address-decreasing direction.

Figure 3:
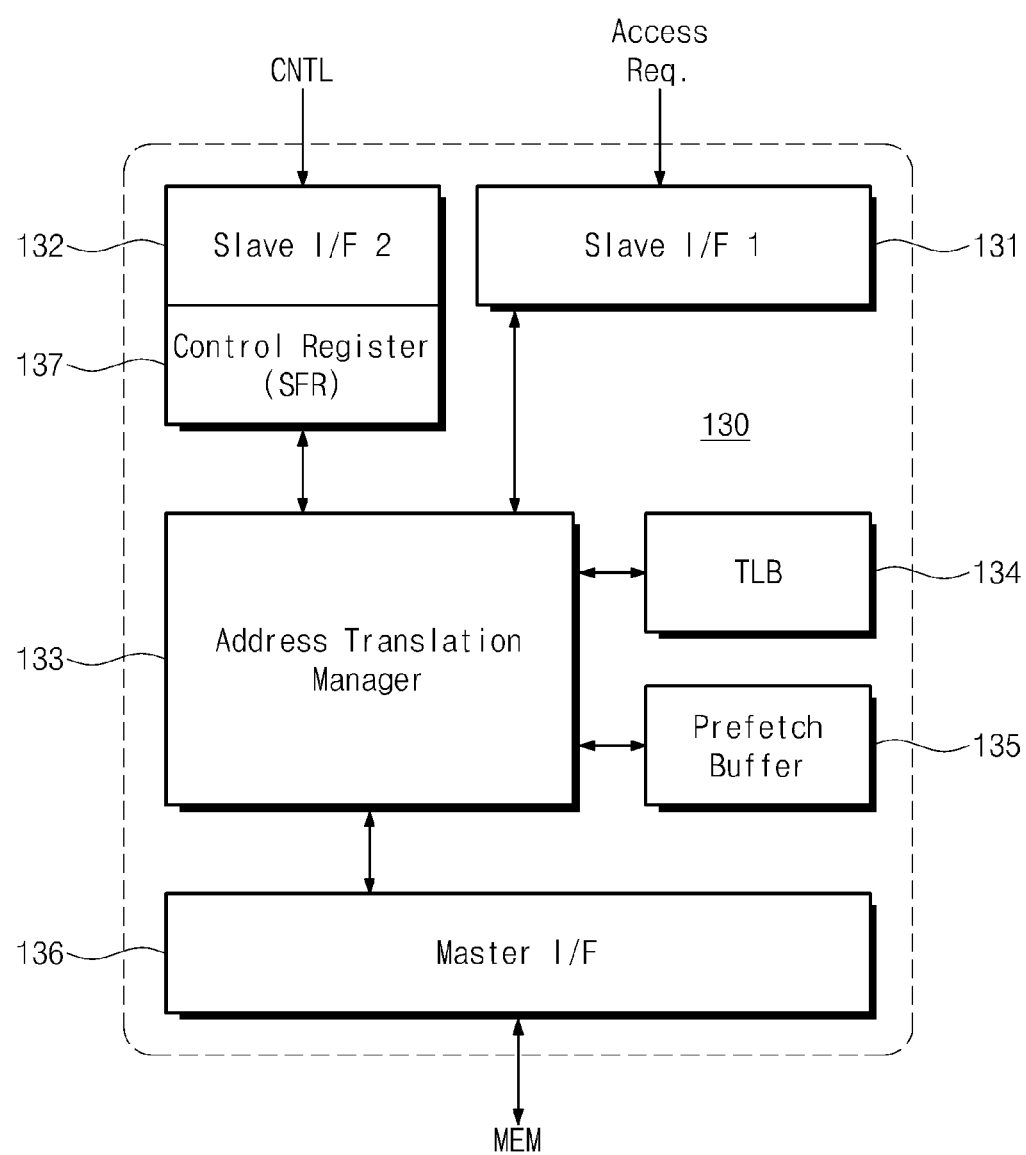
FIG. 3 is a block diagram illustrating an embodiment of a memory management unit according to the inventive concepts.

FIG. 3 is a block diagram illustrating an embodiment of a memory management unit (MMU) 130 according to the inventive concepts. As illustrated, the memory management unit 130 includes slave interfaces 131 and 132, a master interface 136, an address translation manager 133, a translation lookaside buffer (hereinafter referred to as "TLB") 134, a prefetch buffer 135, and a control register (special function register SFR) 137. When an access request occurs, the memory management unit 130 prefetches a page descriptor in units of sub-blocks with reference to access direction information ADI1 or ADI2 and stores the prefetched page descriptor in the prefetch buffer 135.

In some embodiments, the first slave interface 131 provides interfacing with a hardware intellectual property 120 (see FIG. 1) that is a master of the memory management unit 130. In some embodiments, the first slave interface 131 may have an interfacing structure corresponding to, for example, an advanced extensible interface (AXI) protocol. The hardware intellectual property 120 may transfer a memory access request to the memory management unit 130 through the first slave interface 131. The memory management unit 130 may receive a request for access to the memory 150 through main channels AR and AW of the first slave interface 131. In addition, the memory management unit 130 may receive access direction information ADI2 from the hardware intellectual property 120 through the first slave interface 131.

In some embodiments, the second slave interface 132 is a separate slave interface to set the control register 137. For example, a processing unit 110 (see FIG. 1) may control a specific operation of the memory management unit 130 through the second slave interface 132. The second slave interface 132 may communicate with the processing unit 110 according to, for example, an advanced peripheral bus (APB) protocol. The memory management unit 130 may receive access direction information ADI1 provided from a software level (e.g., device driver) through the second slave interface 132. The received access direction information ADI1 and ADI2 may be stored in the control register 137.

The address translation manager 133 operates to perform the translation of an access-requested virtual address VA to a physical address PA. The address translation manager 133 primarily inspects the translation lookaside buffer 134 to translate a virtual address VA provided from the hardware intellectual property 120 through the address channels AR and AW to a physical address PA. When a page descriptor of a requested virtual address VA is present in the translation lookaside buffer 134 (TLB hit), the address translation manager 133 may generate a physical address PA with reference to a corresponding page descriptor. When a page descriptor of a requested virtual address VA is not present in the translation lookaside buffer 134 (TLB miss), the address translation manager 133 may next inspect the prefetch buffer 135.

When a page descriptor of a requested virtual address VA is present in the prefetch buffer 135 (PB hit), the address translation manager 133 may generate a physical address PA with reference to a corresponding page descriptor and may access a corresponding memory device using the physical address. When a page descriptor of a requested virtual address VA is not present in the prefetch buffer 135 (PB miss), the address translation manager 133 may operate to perform a block fetch or may operate to read a page descriptor from an address translation table 155 (see FIG. 1) of the memory 150.

In addition, the address translation manager 133 operates to prefetch a page descriptor of an access-expected memory area in units of sub-blocks with reference to the access direction information ADI1 and ADI2, as provided by the hardware intellectual property 120 or the processing unit 110. The address translation manager 133 responds by storing the thereby prefetched page descriptors in the prefetch buffer 135. In some embodiments, the address translation manager 133 may update the page descriptor stored in the prefetch buffer 135 in units of sub-blocks.

The translation lookaside buffer 134 is a type of cache memory that is used to improve translation speed in a case where the system requires translation from a virtual address VA to a corresponding physical address PA. In some embodiments, page descriptor entries of one or more frequently used memory addresses may be stored in the translation lookaside buffer 134. When no page descriptor in an entry of the translation lookaside buffer 134 is present, an access to the memory 150 for reading the page descriptor is required.

The prefetch buffer 135 is a buffer in which page descriptors of an access-expected virtual address can be prefetched and stored in accordance with a determination of the address translation manager 133. In some example embodiments, in response to the access direction information ADI1 or ADI2 provided, for example, by the processing unit 110 or the hardware intellectual property 120, the address translation manager 133 fetches page descriptors in units of sub-blocks and stores the fetched page descriptors in the prefetch buffer 135. In some embodiments. The prefetch buffer 135 may have storage that is sufficient in size to store page descriptors of multiple sub-blocks, for example two sub-blocks. When all page descriptors of a given sub-block size included in the prefetch buffer 135 are used in address translation, page descriptors of another single sub-block size are subsequently referenced in address translation. At this point, subsequent page descriptors are prefetched in units of sub-blocks and stored in a buffer region of all the page descriptors. As such, the prefetch buffer 135 may be controlled in a dual buffering manner of alternately prefetching and storing page descriptors in units of sub-blocks.

Information that is used to control the operation of the memory management unit 130 is stored in the control register 137. For example, in some embodiments, the access direction information ADI1 or ADI2 provided by the slave interfaces 131 or 132, or information PBMI with respect to the prefetch buffer 135, may be stored in the control register 137. In some embodiments, the address translation manager 133 may determine a memory area to be prefetched with reference to the information stored in the control register 137. Further, the address translation manager 133 may determine whether the prefetch buffer 135 is being used in connection with input traffic with reference to information set to the control register 137. This function is described herein with reference to the various figures.

The master interface 136 provides interfacing for communication with the interconnector 140 or the memory 150. In some embodiments, the physical address PA translated through the master interface 136 may be transferred downstream. In some embodiments, the memory management unit 130 may read the address translation table 155 of the memory 150 through the master interface 136 or may access a frame buffer area through the master interface 136.

The above-described memory management unit 130 may operate to prefetch page descriptors with reference to the access direction information ADI1 or ADI2. In doing so, the memory management unit 130 may significantly reduce address translation overhead during an operation that requires repeated access to an access-requested memory address.

FIG. 4 illustrates a prefetch buffer (PB) 135 including at least two sub-prefetch buffers, according to the inventive concepts. As illustrated, the prefetch buffer 135 includes at least two sub-prefetch buffers Sub-PB0 and Sub-PB1 corresponding to update units.

When page descriptors stored in any one sub-prefetch buffer unit of the prefetch buffer 135 have all been used, the address translation manager 133 prefetches and overwrites a page descriptor of a sub-block unit into an exhausted sub-prefetch buffer. While any one sub-prefetch buffer Sub-PB0 is used to translate a current access-requested virtual address VA, the address translation manager 133 may prefetch page descriptors of predicted addresses to another sub-prefetch buffer Sub-PB1 in response to the access direction information ADI1 and ADI2.

In some embodiments, the address translation manager 133 may issue a prefetch request to fill one sub-prefetch buffer Sub-PB1 at a time when a page descriptor used in a current address translation operation corresponds to a start position of the sub-prefetch buffer Sub-PB0. That is, when an address stored in a start slot, for example Slot_0, of any one sub-prefetch buffer (e.g., Sub-PB0) matches a current input virtual address VA, the address translation manager may interpret this as a point in time for updating the other sub-prefetch buffer (e.g., Sub-PB1). However, it will be understood that other update methods are equally applicable to the principles of the inventive concepts.

In some embodiments, each of the sub-prefetch buffers Sub-PB0 and Sub-PB1 may include N slots. In some embodiments, a single page descriptor may be stored in each slot. In some embodiments, when access-requested virtual addresses are input in a predicted order, the references to the sub-prefetch buffers Sub-PB0 and Sub-PB1 may be sequentially conducted.

Figure 5:
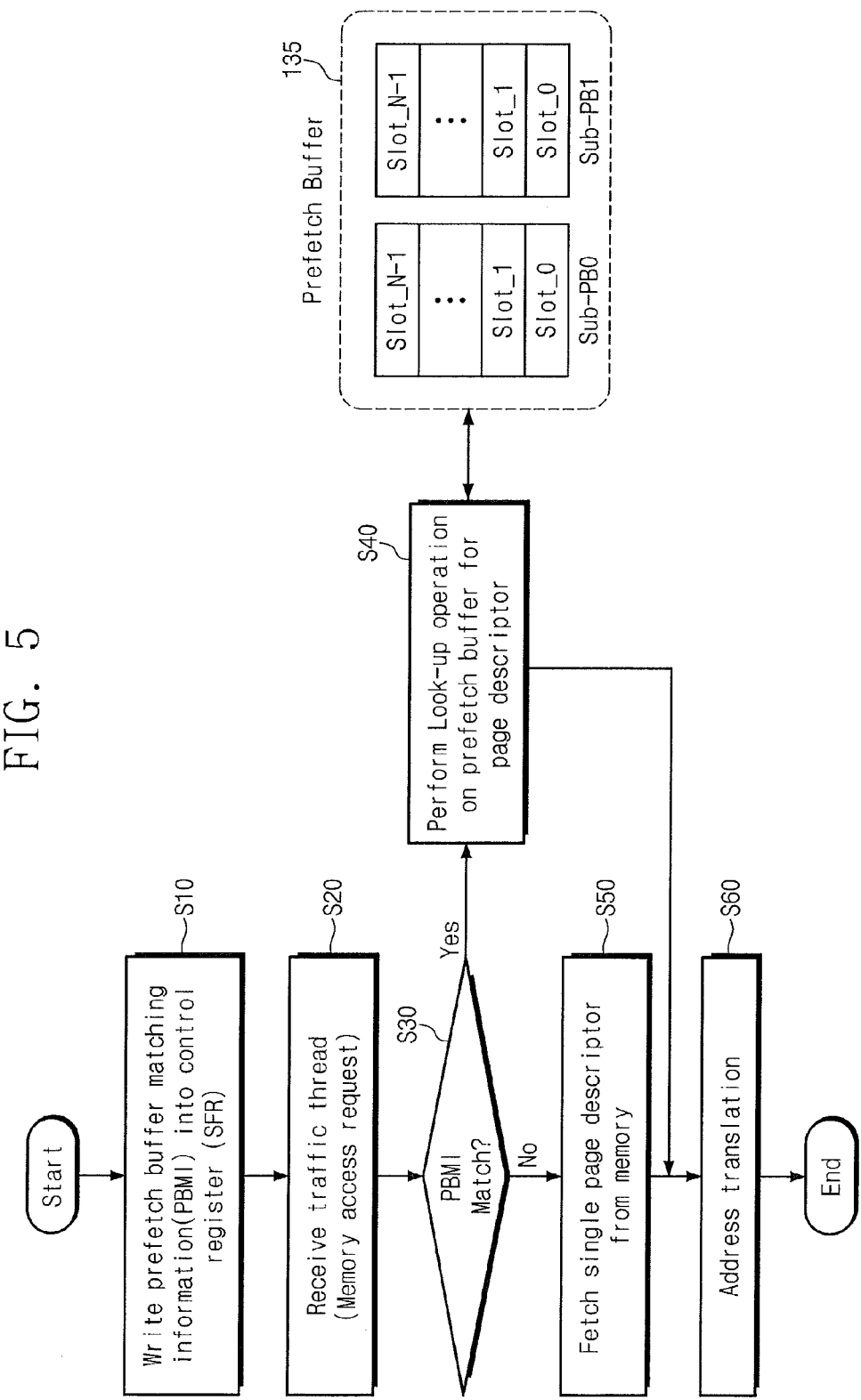
FIG. 5 illustrates a prefetch buffer matching method according to an embodiment of the inventive concepts.

FIG. 5 illustrates a prefetch buffer matching method according to an embodiment of the inventive concepts. Referring to FIG. 5, prefetch buffer matching information PBMI stored in a control register 137 (see FIG. 3) and input information of an input traffic thread are compared with each other. According to a result of the comparison, a look-up operation is performed on a prefetch buffer 135 (see FIG. 3).

In operation S10, the prefetch buffer matching information PBMI is set or written to the control register 137 by a processing unit 110 or a hardware intellectual property 120. In general, when the prefetch buffer is used, the prefetch buffer matching information PBMI may be compared to traffic threads in order to reduce address translation overhead. For example, in an operation such as rotation of a liquid crystal display (LCD), the prefetch buffer matching information PBMI may be repeatedly referenced with respect to a specific memory area during read and write operations of a frame buffer. In this case, a page descriptor may be prefetched to the prefetch buffer 135. The processing unit 110 or the hardware intellectual property 120 may program the prefetch buffer matching information PBMI into the control register 137 of the memory management unit 130 according to such traffic characteristics. In some embodiments, the prefetch buffer matching information PBMI may be ID information of a requested traffic thread or may be a specific signal applied by a user.

In operation S20, the memory management unit 130 receives a traffic thread from the hardware intellectual property 120. That is, the memory management unit 130 receives a memory access request from the hardware intellectual property 120. At this point, virtual address (VA) information, ID information, and specific signal information are provided during a request for memory access.

In operation S30, an address translation manager 133 (see FIG. 3) may compare the prefetch buffer matching information PBMI stored in the control register 137 with input matching information. In some embodiments, the input matching information may comprise one of virtual address (VA) information, ID information, and specific signal information. When the input matching information matches the prefetch buffer matching information PBMI stored in the control register (Yes direction), the flow proceeds to operation S40. Meanwhile, when the input matching information does not match the prefetch buffer matching information PBMI stored in the control register (No direction), the flow proceeds to operation S50.

In operation S40, the address translation manager 133 performs a look-up operation on the prefetch buffer 135. Afterwards, the flow proceeds to operation S60 in which a page descriptor selected from the prefetch buffer 135 is used to translate an access-requested virtual address VA to a physical address PA.

In operation S50, when the address translation manager 133 determines that there is no page descriptor corresponding to a virtual address VA requested to access in the prefetch buffer 135, the address translation manager 133 accesses a memory 150. The address translation manager 133 responds by fetching a page descriptor corresponding to the virtual address VA in an address translation table 155 included in the memory 150.

In operation S60, the address translation manager 133 may perform an address translation operation using a page descriptor fetched from the memory 150 or using a page descriptor present in the prefetch buffer 135.

Hitherto, a thread of a requested traffic and a matching method of the prefetch buffer 135 have been briefly described. In some embodiments, the use rate of the prefetch buffer for a specific thread may increase through matching of the prefetch buffer 135. A user may set a predefined setting as to whether the prefetch buffer 135 is to be used for the specific traffic. Accordingly, utilization of the prefetch buffer 135 may be thereby assigned to certain types of data traffic or to certain data threads where latency has a decisive influence on performance.

Figure 6:
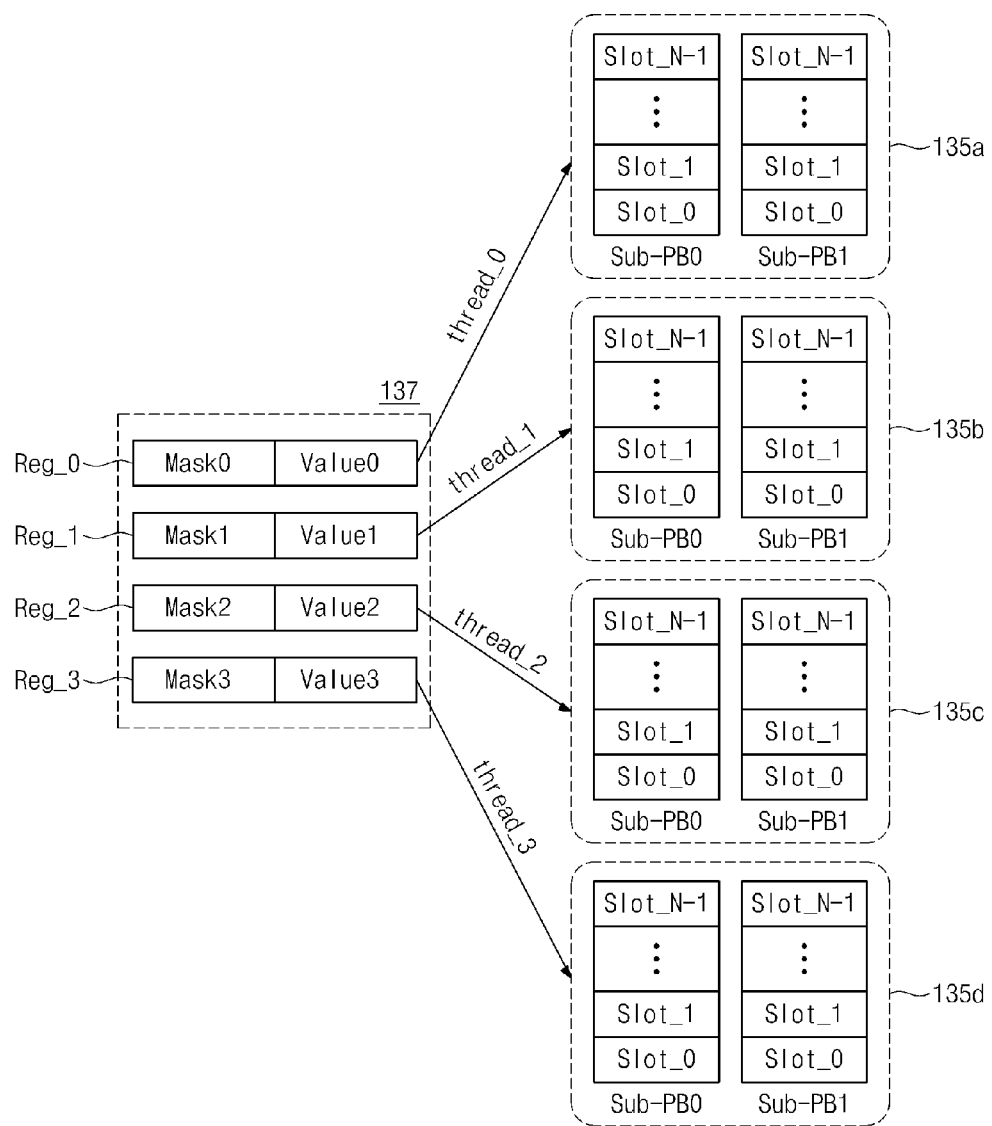
FIG. 6 is a block diagram illustrating a control register and a prefetch buffer used in a prefetch buffer matching method according to the inventive concepts.

FIG. 6 is a block diagram illustrating a control register and a prefetch buffer used in a prefetch buffer matching method according to the inventive concepts. Referring to FIG. 6, prefetch buffer matching information PBMI programmed into a control register 137 may support an access of a plurality of traffic threads.

The programmed prefetch buffer matching information PBMI may be stored in respective registers Reg_0~Reg_3 by a user. When an input traffic matches the prefetch buffer matching information PBMI stored in the register Reg_0, an address translation manager 133 may respond by accessing the prefetch buffer 135a for translation look-up. In other examples, when the input traffic matches the prefetch buffer matching information PBMI stored in the register Reg_2, the address translation manager 133 may look up a prefetch buffer 135c. If such a plurality of prefetch buffer matching information PBMI and prefetch buffers 135a, 135b, 135c, and 135d are employed, high address translation speed may be provided to input traffic by way of applying multiple prefetch buffers.

In some embodiments, the prefetch buffer matching information programmed into the respective registers Reg_0~Reg_3 by the user may take the form of start and end addresses of a virtual address VA and ID information related to the data traffic. When the prefetch buffer matching information operates with the start and end addresses of the virtual address VA, a start virtual address and an end virtual address of a corresponding thread may be stored in the respective registers Reg_0~Reg_3. When the prefetch buffer matching information operates with the ID information of the traffic, at least two information elements, for example Mask and Value, having the same length as the ID information are stored in the respective registers Reg_0~Reg_3. Bit values indicating thread characteristics may be stored in the mask information Mask, and the value information Value may be assigned as lower two bits of ID, assuming four prefetch buffers are employed.

The prefetch buffer matching information is not limited to the above-description. It will be understood that various types of information capable of easily providing a traffic or thread-dependent identification of a corresponding traffic may be used.

Figure 7A:
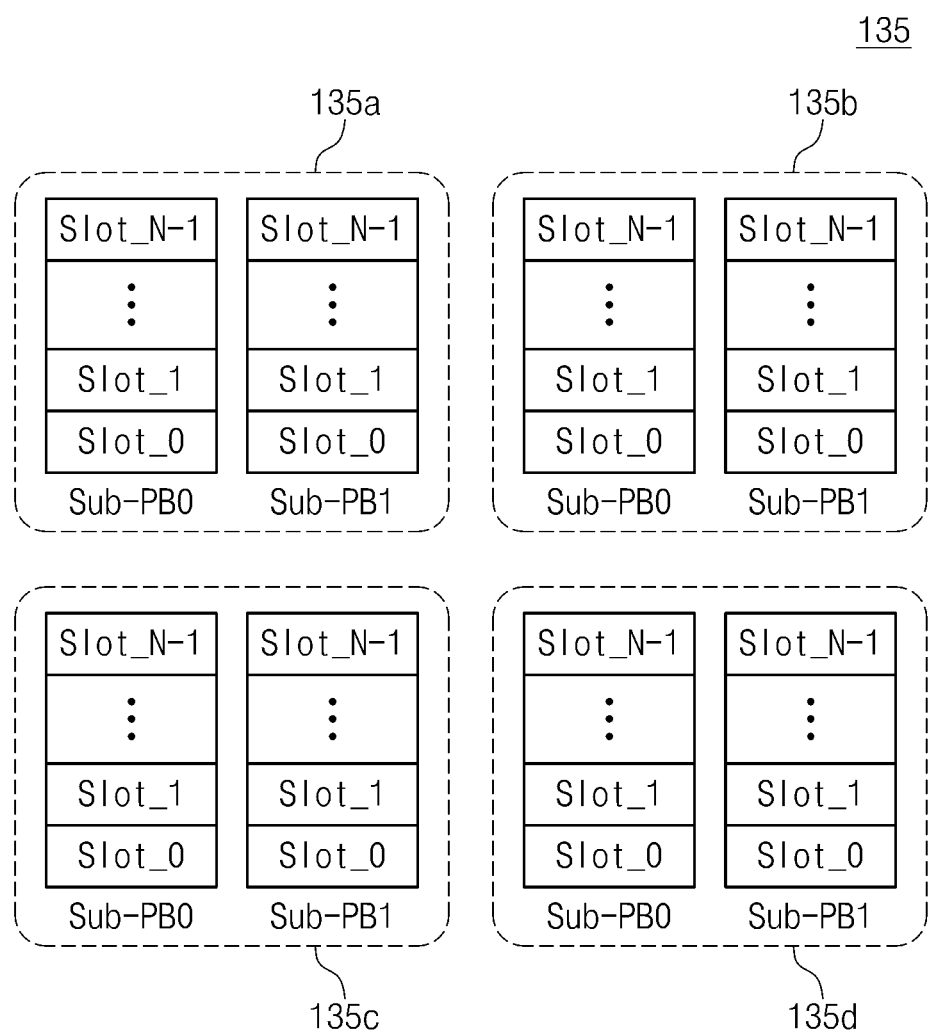
FIG. 7A illustrates an embodiment of a prefetch buffer comprised of a plurality of prefetch buffers, according to the inventive concepts.
Figure 7B:
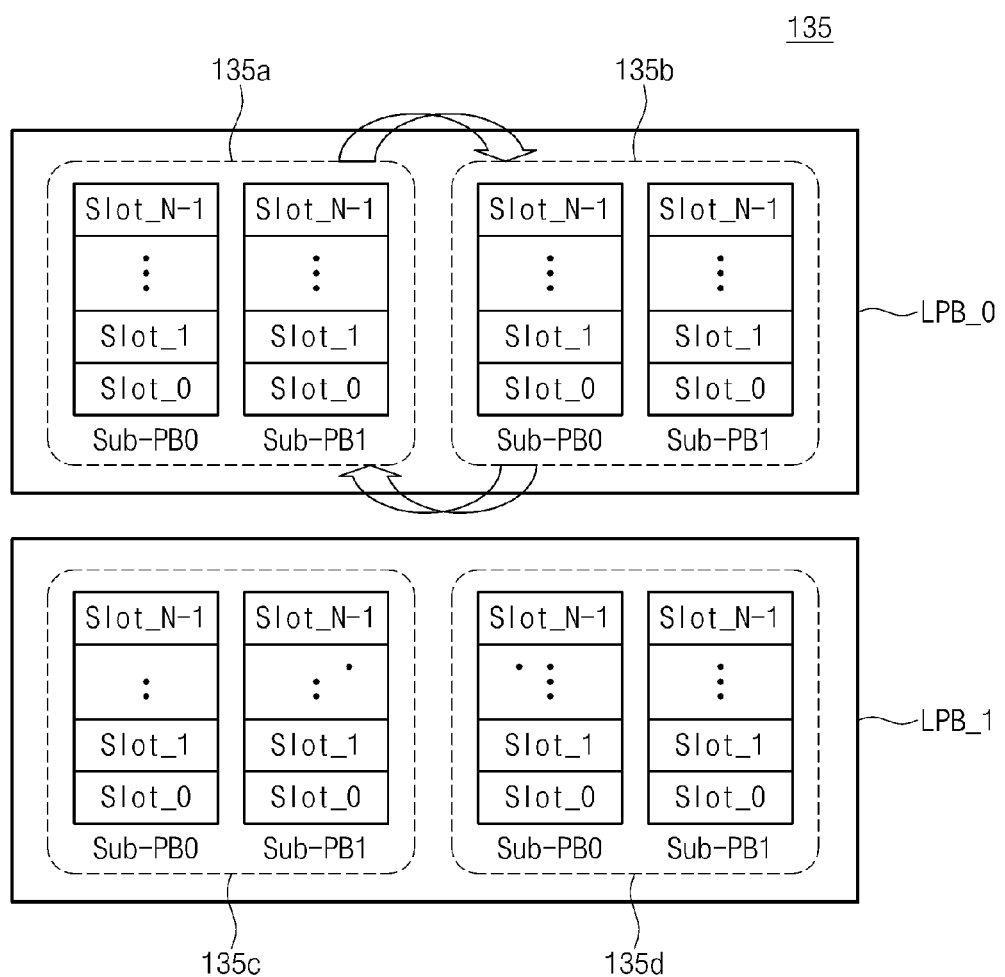
FIG. 7B illustrates an embodiment of a prefetch buffer which includes a plurality of logical prefetch buffers, according to the inventive concepts.

FIGS. 7A and 7B illustrate another embodiment of a prefetch buffer. In FIG. 7A, each of a plurality of prefetch buffers 135a, 135b, 135c, and 135d may include two sub-blocks and may be set to have a single block size. On the other hand, FIG. 7B illustrates prefetch buffers 135a and 135b constituting a single logical prefetch buffer LPB_0 and prefetch buffers 135c and 135d constituting another single logical prefetch buffer LPB_1.

Referring to FIG. 7A, a prefetch buffer 135 may be divided into a plurality of prefetch buffers 135a, 135b, 135c, and 135d. The prefetch buffers 135a, 135b, 135c, and 135d may be physically separated buffers of a minimum unit in size, respectively. When a thread characteristic of an input thread is a relatively small-sized data request, a memory management unit 130 (FIG. 3) may operate the prefetch buffer 135 in accordance with the minimum unit. That is, each of the prefetch buffers 135a, 135b, 135c, and 135d may be set to support a single thread.

FIG. 7B illustrates that four physical prefetch buffers 135a, 135b, 135c, and 135d may be logically managed as two logical prefetch buffers LPB_0 and LBP_1. The prefetch buffers 135a and 135b may be classified as first logical prefetch buffer LPB_0 which are logically separated from each other, and the prefetch buffers 135c and 135d may be classified as second logical prefetch buffers LPB_1. In this case, a unit of prefetch may be a single block size. That is, the overall entire prefetch buffer 135a may be updated by performing a single prefetch operation. The number of page descriptors prefetched at a time may be 2N. When at least two prefetch buffers are used after being logically bundled, higher address translation performance may be achieved for certain types of data traffic.

Setting information may be provided by a user or a processing unit 110 to logically merge or classify update units of prefetch buffers in the manner described with respect to FIGS. 7A and 7B. In some embodiments, the update unit of the prefetch buffer 135 may be set with reference to traffic characteristics provided from a hardware intellectual property 120, the amount of data to be used in a single thread, or the format of a requested thread.

Figure 8:
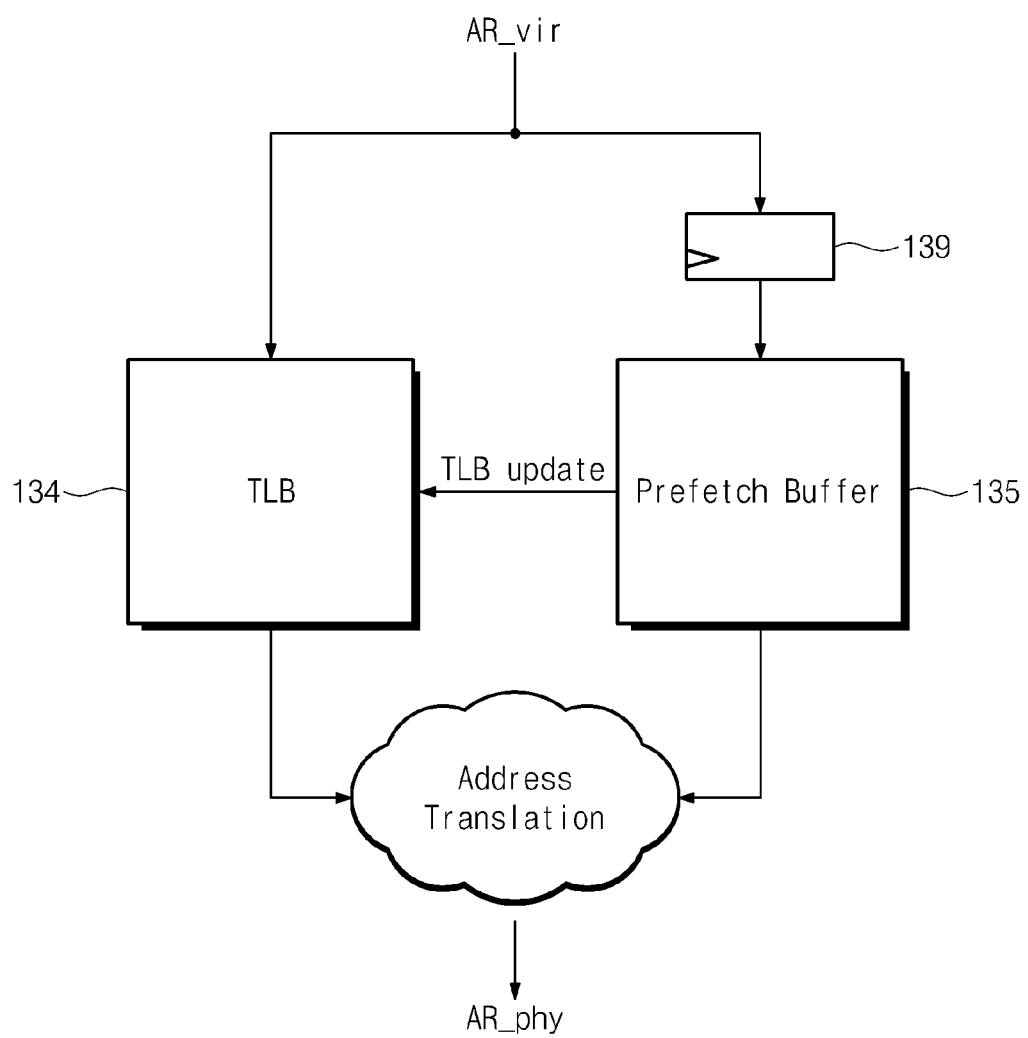
FIG. 8 is a block diagram illustrating translation of a virtual address to a physical address utilizing a prefetch buffer according to the inventive concepts.

FIG. 8 is a block diagram illustrating translation of a virtual address to a physical address utilizing a prefetch buffer according to the inventive concepts. Referring to FIG. 8, a memory management unit may perform a selective update to a translation lookaside buffer 134 in accordance with locality detected by operating the prefetch buffer 135.

The address translation manager 133 may analyze a local characteristic of page descriptors prefetched to the prefetch buffer 135. In general, such a local characteristic may be categorized as spatial locality or temporal locality. Spatial locality means that if a hardware intellectual property 120 accesses a specific memory address, it also accesses an address near the specific address. Temporal locality means that if the hardware intellectual property 120 accesses a specific memory address, it frequently accesses the specific memory address.

The translation lookaside buffer 134 is a priority buffer where a page descriptor for an input virtual address VA is first looked up. The translation lookaside buffer 134 corresponds to a component having highest look-up speed. Accordingly, among the page descriptors prefetched to the prefetch buffer 135, page descriptors having relatively high temporal locality and low spatial locality may be stored in the translation lookaside buffer 134. On the other hand, page descriptors having relatively high temporal locality and high spatial locality may be stored in the prefetch buffer 135.

The address translation manager 133 may selectively update the page descriptors stored in the prefetch buffer 135 according to a register value set in the control register 137. By programming of a user's selection or by programming of software, a determination may be made as to whether the translation lookaside buffer 134 will update the page descriptors. In some embodiments, the processing unit 110 (see FIG. 1) writes the setting information on the translation lookaside buffer 134 into the control register 137 to activate the update to the translation lookaside buffer 134.

The address translation manager 133 may select repeatedly accessed virtual addresses VA, among those page descriptors to be prefetched to the prefetch buffer 135, within a specific time period with reference to the setting information. In some example embodiments, the address translation manager 133 may move the selected page descriptors to the translation lookaside buffer 134 and may allow only those page descriptors having high spatial locality to remain in the prefetch buffer 135.

Continuing to refer to FIG. 8, when a virtual address AR_vir is input to the memory management unit 130, the translation lookaside buffer 134 is first inspected, or looked up. Flip-flop 139 in this instance refers to a conceptual component for explaining that look-up priority of the translation lookaside buffer 134 is higher than that of the prefetch buffer 135 in a translation operation of the virtual address AR_vir. If a page descriptor corresponding to the virtual address AR_vir is present in the translation lookaside buffer 134, the address translation manager 133 may carry out an address translation operation using a looked-up page descriptor. Then, the address translation manager 133 may transfer a translated physical address AR_phy to a target memory.

As a look-up result of the translation lookaside buffer 134, when no page descriptor corresponding to the virtual address AR_vir is present, the prefetch buffer 135 is inspected, or looked up. When any one of the page descriptors fetched to the prefetch buffer 135 matches the virtual address AR_vir, the address translation manager 133 may carry out an address translation operation using the looked-up page descriptor. In response, the address translation manager 133 may transfer a translated physical address AR_phy to a target memory.

In consideration of a reference pattern of the prefetch buffer 135, the address translation manager 133 determines whether an update to the translation lookaside buffer 134 is to be performed. In some example embodiments, if a page descriptor is determined to have relatively high spatial locality and relatively low temporal locality, the update to the translation lookaside buffer 134 is blocked. Meanwhile, in some embodiments, a page descriptor determined to have high temporal locality can be copied to the translation lookaside buffer 134.

Figure 9:
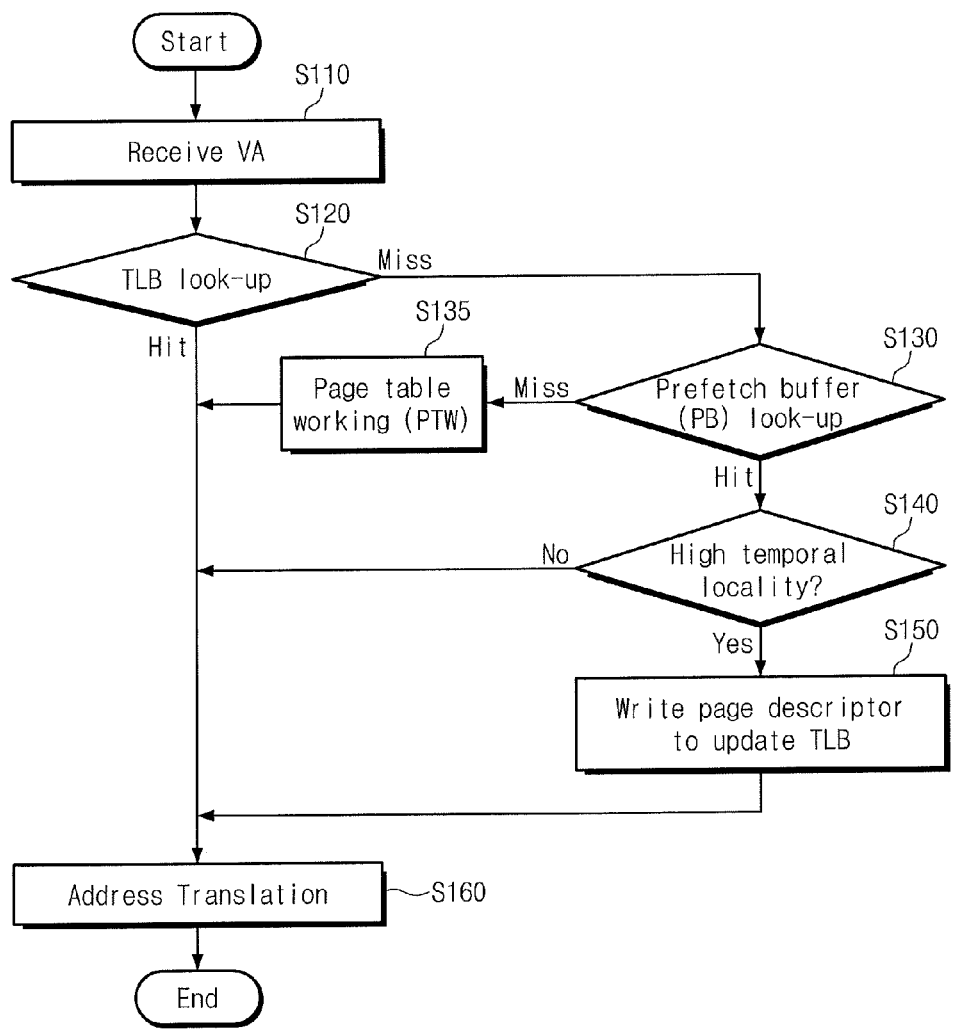
FIG. 9 is a flowchart illustrating a conditional update method of a translation lookaside buffer (TLB) according to the inventive concepts.

FIG. 9 is a flowchart illustrating a conditional update method of a translation lookaside buffer (TLB) according to the inventive concepts. Referring to FIG. 9, a memory management unit 130 updates a page descriptor of a virtual address hit to a prefetch buffer 135 to a translation lookaside buffer 134 with reference to spatial locality. This will now be described in detail.

In operation S110, the memory management unit 130 may receive a memory access request provided from a hardware intellectual property 120 through an address channel. An address of a memory requested to be accessed through the address channel is provided through an input virtual address VA mapped to a virtual memory.

In operation S120, an address translation manager 133 of the memory management unit 130 performs a look-up operation to determine whether a page descriptor of the received virtual address VA is present in the translation lookaside buffer 134. When a page descriptor corresponding to an access-requested virtual address VA is present in the translation lookaside buffer 134 (Hit), the flow proceeds to operation S160. Meanwhile, when a page descriptor corresponding to an access-requested virtual address VA is not present in the translation lookaside buffer 134 (Miss), the flow proceeds to operation S130.

In operation S130, the address translation manager 133 determines whether a page descriptor corresponding to a received virtual address VA is present in the prefetch buffer 135. When a page descriptor corresponding to a received virtual address VA is not present in the prefetch buffer 135 (Miss), the flow proceeds to operation S135. Meanwhile, when a page descriptor corresponding to a received virtual address VA is present in the prefetch buffer 135 (Hit), the flow proceeds to operation S140.

In operation S135, the address translation manager 133 reads a page descriptor corresponding to the access-requested virtual address VA from an address translation table 155 of the memory 150. This operation is referred to herein as 'page table working' (PTW).

In operation S140, the address translation manager 133 may determine temporal or spatial locality with respect to a hit virtual address VA in the prefetch buffer 135. In the present illustrative embodiment, characteristics for temporal locality are estimated. When the temporal locality is equal to or higher than a reference value, the flow proceeds to operation S150. If the temporal locality is less than the reference value, the flow jumps to operation S160. The temporal locality may be determined based on the number and time point of accesses to the same virtual address VA.

In operation S150, the address translation manager 133 writes a page descriptor corresponding to the virtual address VA into the translation lookaside buffer 134. That is, a page descriptor of the virtual address VA having high temporal locality may be updated to the translation lookaside buffer 134. In some embodiments, this update may be performed irrespective of spatial locality. As a result, page descriptors of the virtual address VA having relatively low temporal locality and relatively high spatial locality are present in the prefetch buffer 135 but are not updated to the translation lookaside buffer 134.

In operation S160, the address translation manager 133 may translate a virtual address VA to a physical address using the page descriptor looked up or fetched from the address translation table 155.

Various methods of updating a page descriptor in the prefetch buffer 135 to the translation lookaside buffer in accordance with temporal locality have been described. However, it will be understood that the standard for update to the translation lookaside buffer 134 may be variously changed. That is, a user may write the degree or different criteria of locality into the control register to variously change setting of update to the translation lookaside buffer 134.

Figure 10:
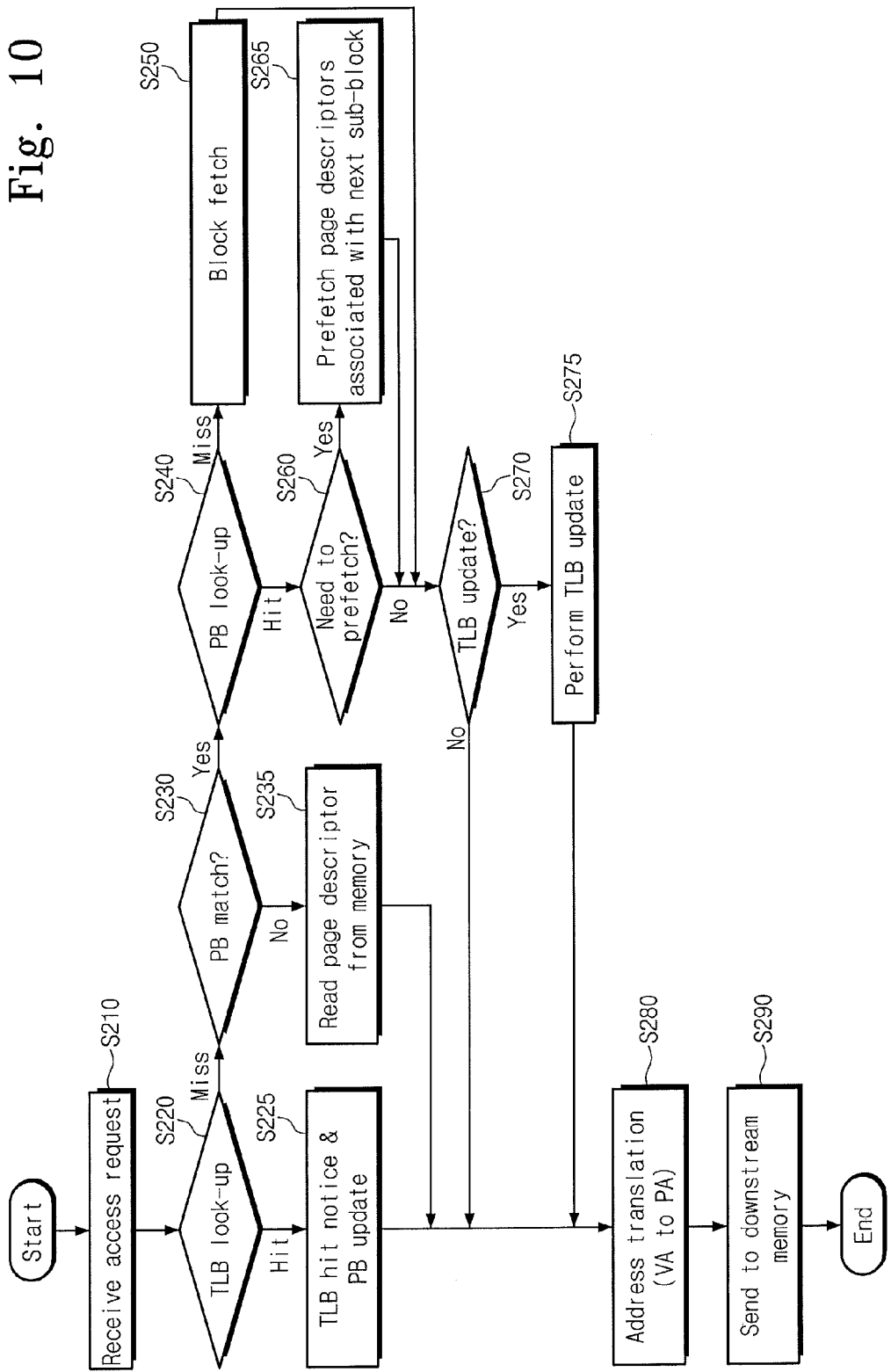
FIG. 10 is a flowchart illustrating an address translation method using a prefetch buffer according to an embodiment of the inventive concepts.

FIG. 10 is a flowchart illustrating an address translation method using a prefetch buffer according to an embodiment of the inventive concepts. Referring to FIG. 10, the operation of a memory management unit 130 including a translation lookaside buffer 134 (see FIG. 3) and a prefetch buffer 135 (see FIG. 3) will be described on the basis of a time point of issuance of an access request.

In operation S210, the memory management unit 130 may receive a memory access request issued in accordance with a virtual address VA received from a hardware intellectual property 120.

In operation S220, the memory management unit 130 may determine whether a page descriptor related to the virtual address provided from the hardware intellectual property 120 is present in the translation lookaside buffer 134. That is, the memory management unit 130 may perform a look-up operation on the translation lookaside buffer 134. As a result of the look-up operation on the translation lookaside buffer 134, when such a page descriptor related to the received virtual address VA is present in the translation lookaside buffer 134 (Hit), the flow proceeds to operation S225. Meanwhile, when a page descriptor related to the received virtual address VA is not present in the translation lookaside buffer 134 (Miss), the flow proceeds to operation S230.

In operation S225, the address translation manager 133 performs an update operation of the prefetch buffer 135 in accordance with the "Hit" of the translation lookaside buffer 134. If the translation lookaside buffer 134 is repeatedly hit, the prefetch buffer 135 may not require an update. In this case, when inspection of the translation lookaside buffer 134 results in a "Miss", the probability that the prefetch buffer 135 is also in a miss condition "Miss" increases. In order to overcome the disadvantage, the update of the prefetch buffer 135 can be performed even in a case where the translation lookaside buffer 134 inspection results in a "Hit". An update method of the prefetch buffer 135 in a case where the translation lookaside buffer 134 is "Hit" will be described herein with reference to FIG. 11.

In operation S230, the memory management unit 130 determines whether the prefetch buffer includes a match for the input virtual address VA. That is, the address translation manager 133 may detect whether the input virtual address VA matches prefetch buffer matching information PBMI stored in a control register 137. When start and end information or ID information of the access-requested virtual address VA matches the prefetch buffer matching information PBMI, the flow proceeds to operation S240. Meanwhile, when start and end information or ID information of the access-request virtual address VA does not match the prefetch buffer matching information PBMI, the flow proceeds to operation S235.

In operation S235, the memory management unit 130 reads a page descriptor with respect to the virtual address VA from an address translation table 155 included in a memory 150. That is, the memory management unit 130 may read a single page descriptor corresponding to the virtual address VA.

In operation S240, the memory management unit 130 performs a look-up operation on the prefetch buffer 135. A determination may be made as to whether a page descriptor matching the access-requested virtual address VA is present in the prefetch buffer 135. As a result of the look-up operation on the prefetch buffer 135, when a page descriptor with respect to a provided virtual address VA is present (Hit), the flow proceeds to operation S260. Meanwhile, when no page descriptor with respect to a provided virtual address VA is present (Miss), the flow proceeds to operation S250.

In operation S250, a block fetch operation is performed. According to the prefetch buffer matching operation in the operation S230, there must be a page descriptor corresponding to the requested virtual address VA in the prefetch buffer 135. However, even in this case, a page descriptor is prefetched to the prefetch buffer 135 through the block fetch with respect to a virtual address that is outside an expected range. Undoubtedly, although there is inherent address translation overhead on a current access-requested virtual address VA, a "Hit" of the prefetch buffer 135 may be assured with respect to the next access request. After the block fetch operation, the flow proceeds to operation S270.

In operation S260, a determination is made as to whether there is a need to prefetch a page descriptor for a single sub-prefetch buffer Sub-PB. For example, in some instances, a page descriptor of a current access-requested virtual address VA may be disposed at the last slot of the sub-prefetch buffer Sub-PB0. After a corresponding descriptor is used, the next access-expected page descriptors can be prefetched from the memory 150 and overwritten (Yes direction). In this case, the flow proceeds to operation S265. When the page descriptor of a current access-requested virtual address VA is not disposed at the last slot of the sub-prefetch buffer Sub-PB0 (No direction), the flow proceeds to operation S270.

In operation S265, the address translation manager 133 may prefetch a page descriptor of the next access-expected virtual address with reference to address direction information stored in the control register 137. That is, the address translation manager 133 may read the next access-expected page descriptor by the capacity of the sub-prefetch buffer Sub-PB0 and overwrite the read page descriptor into the sub-prefetch buffer Sub-PB0.

In operation S270, the address translation manager 133 determines whether an update to the translation lookaside buffer 134 is to be performed. In some embodiments, the update to the translation lookaside buffer 134 may be performed in the same manner as described in FIG. 9. For example, in some embodiments, with reference to spatial locality and temporal locality, determination may be made on whether an update to the translation lookaside buffer 134 is performed. Among the page descriptors of the current access-requested virtual address, page descriptors having high temporal locality may be updated to the translation lookaside buffer 134. When the temporal locality of the page descriptor of the current access-requested virtual address is high (Yes direction), the flow proceeds to operation S275. Meanwhile, when the temporal locality of the page descriptor of the current access-requested virtual address is low (No direction), the flow proceeds to operation S280.

In operation S275, the address translation manager 133 copies a page descriptor corresponding to the current access-requested virtual address VA to the translation lookaside buffer 134.

In operation S280, the access-requested virtual address VA is translated to a physical address PA with reference to the page descriptor fetched from the translation lookaside buffer 134, the prefetch buffer 135 or the memory 150.

In operation S290, the translated physical address PA may optionally be transferred to the memory 150 via an interconnector 140.

A method of operating the prefetch buffer 135 has been described. Undoubtedly, page descriptors of sub-block units may be stored in the prefetch buffer 135 according to access direction information. If the translation lookaside buffer 134 is updated in association with such a prefetch operation, a relatively high hit rate for a virtual address VA of a repeated pattern may be achieved.

Figure 11:
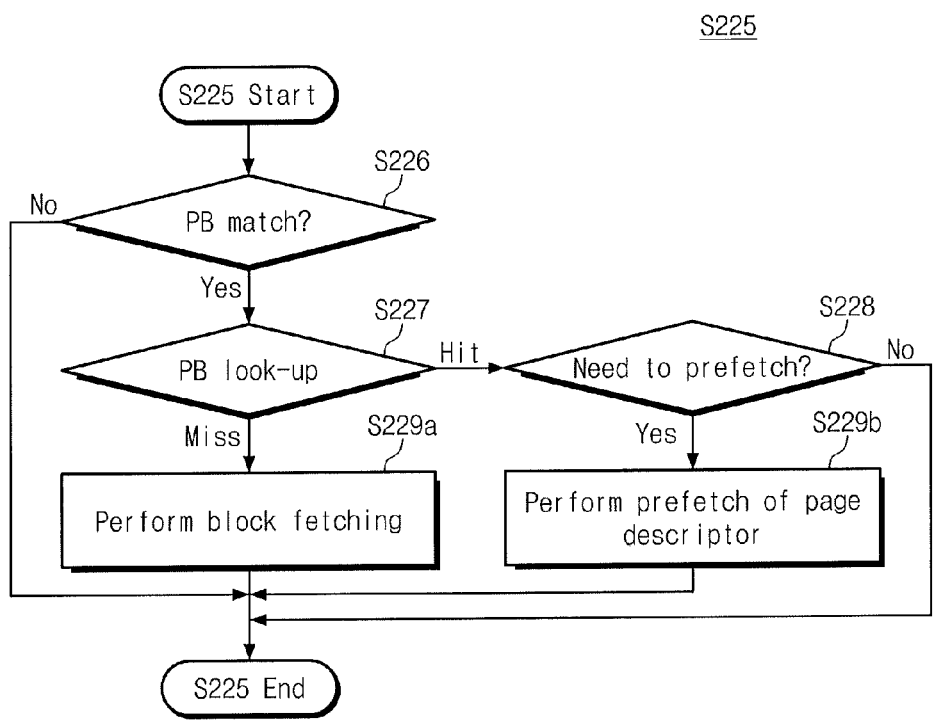
FIG. 11 is a flowchart illustrating an update method of a prefetch buffer (PB) according to the occurrence of a "Hit" of a translation lookaside buffer (TLB) in FIG. 10.

FIG. 11 is a flowchart illustrating a method of updating the prefetch buffer (PB) in a case where a "Hit" of the translation lookaside buffer (TLB) has occurred, as shown in FIG. 10. That is, the operation S225 in FIG. 10 is illustrated more specifically in FIG. 11. Referring to FIG. 11, the prefetch buffer 135 may continue to perform an update even when a "Hit" translation lookaside buffer occurs.

In operation S226, the address translation manager 133 determines whether the contents of a prefetch buffer matches with respect to a virtual address in a case where a "Hit" of the translation lookaside buffer has occurred (hereinafter referred to as "Hit virtual address"). That is, the address translation manager 133 may detect whether the thereby Hit virtual address matches the prefetch buffer matching information PBMI stored in the control register 137. When start and end information or ID information of the Hit virtual address matches the prefetch buffer matching information PBMI (Yes direction), the flow proceeds to operation S227. Meanwhile, when start and end information or ID information of the Hit virtual address does not match the prefetch buffer matching information PBMI (No direction), the flow proceeds to operation S225 End.

In operation S227, the address translation manager 133 performs a look-up operation on the prefetch buffer 135. A determination is made as to whether a page descriptor matching the Hit virtual address VA is present in the prefetch buffer 135. As a result of looking up a page descriptor in the prefetch buffer 135, when a page descriptor is present that matches the Hit virtual address VA (Hit), the flow proceeds to operation S228. Meanwhile, when a page descriptor matching the Hit virtual address VA is not present (Miss), the flow proceeds to operation S229a.

In operation S229a, a block fetch operation is performed. The block fetch operation may be applied to maintain high mutual synchronization between data of the translation lookaside buffer 134 and data of the prefetch buffer 135.

In operation S228, a determination is made as to whether there is a need to prefetch a page descriptor located in a single sub-prefetch buffer Sub-PB. For example, there may occur a case where a page descriptor of a current Hit virtual address VA is disposed at the last slot of the sub-prefetch buffer Sub-PB0. After a corresponding page descriptor is used, the next access-expected page descriptors are to be prefetched from the memory 150 and overwritten (Yes direction). In this case, the flow proceeds to operation S229b. When the page descriptor of a current Hit virtual address VA is not disposed at the last slot of the sub-prefetch buffer Sub-PB0 (No direction), the overall operation may be terminated S225 End.

In operation S229b, the address translation manager 133 may prefetch a page descriptor of the next access-expected virtual address with reference to address direction information (ADI1, ADI2) stored in the control register 137. That is, the address translation manager 133 may read the next access-expected page descriptor from the memory 150 and overwrite the read page descriptor into the sub-prefetch buffer Sub-PB0.

A method of assuring constant-level synchronization between the prefetch buffer 135 and the translation lookaside buffer 134, even when a "Hit" of the translation lookaside buffer 134 occurs, has been described. Although a "Hit" may continuously occur at the translation lookaside buffer 134, page descriptors of the next access-expected virtual address VA may be updated to the prefetch buffer 135.

Figure 12:
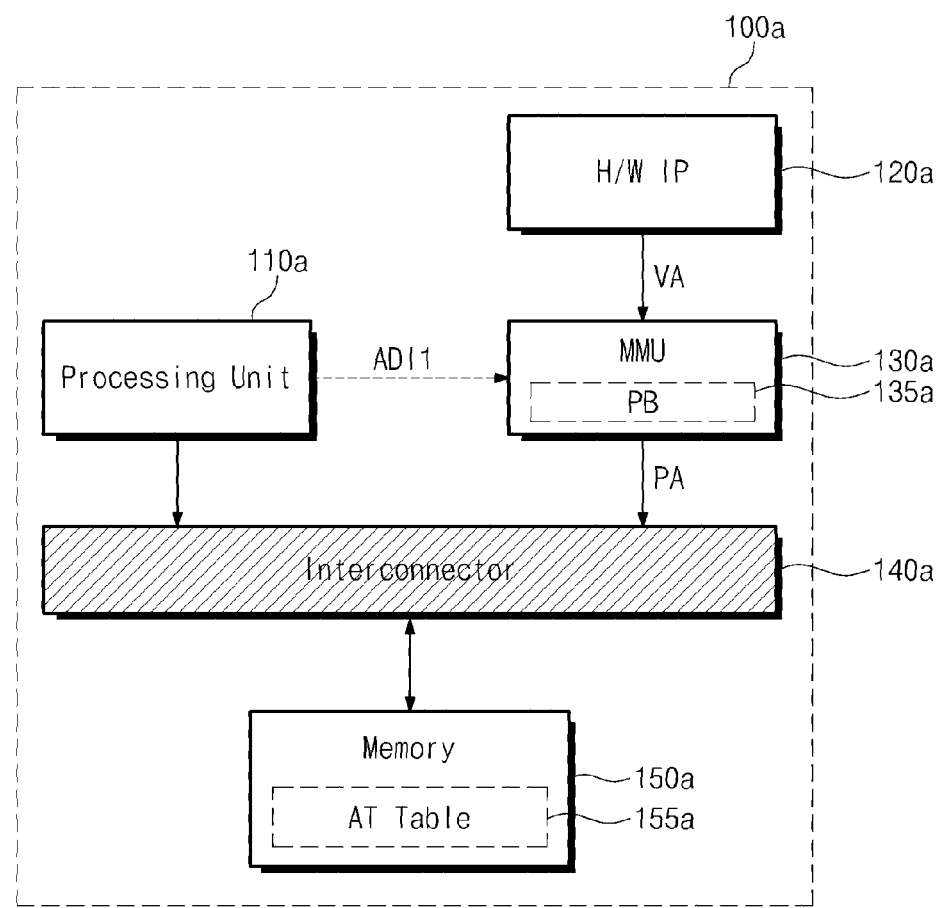
FIGS. 12 and 13 are block diagrams illustrating embodiments of modified versions of the system-on-chip in FIG. 1, respectively according to an embodiment of the inventive concepts.
Figure 13:
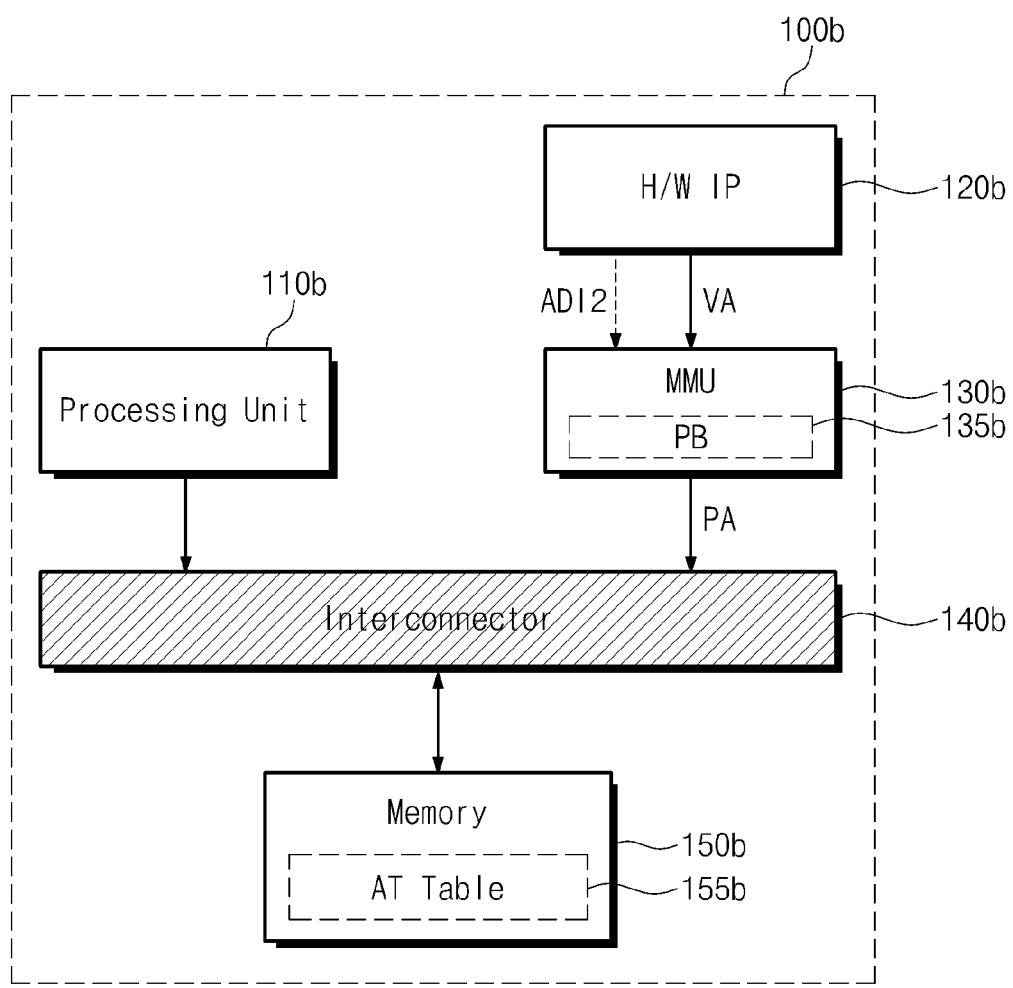

FIGS. 12 and 13 are block diagrams illustrating alternative embodiments of the system-on-chip described in connection with FIG. 1, respectively. The basic operations of system-on-chips 100a and 100b are similar to those of the system-on-chip 100 in FIG. 1. A difference lies, however, in the source of the access direction information ADI for prefetch that the memory management unit 130a in FIG. 12 and the memory management unit 130b in FIG. 13 may receive. In the system-on-chip 100a in FIG. 12, access direction information ADI1 for prefetch of the memory management unit 130a is received from the processing unit 110a. In the system-on-chip in FIG. 13, access direction information ADI2 for prefetch of the memory management unit 130b is received from the processing unit 110b or the hardware IP 120b.

Figure 14:
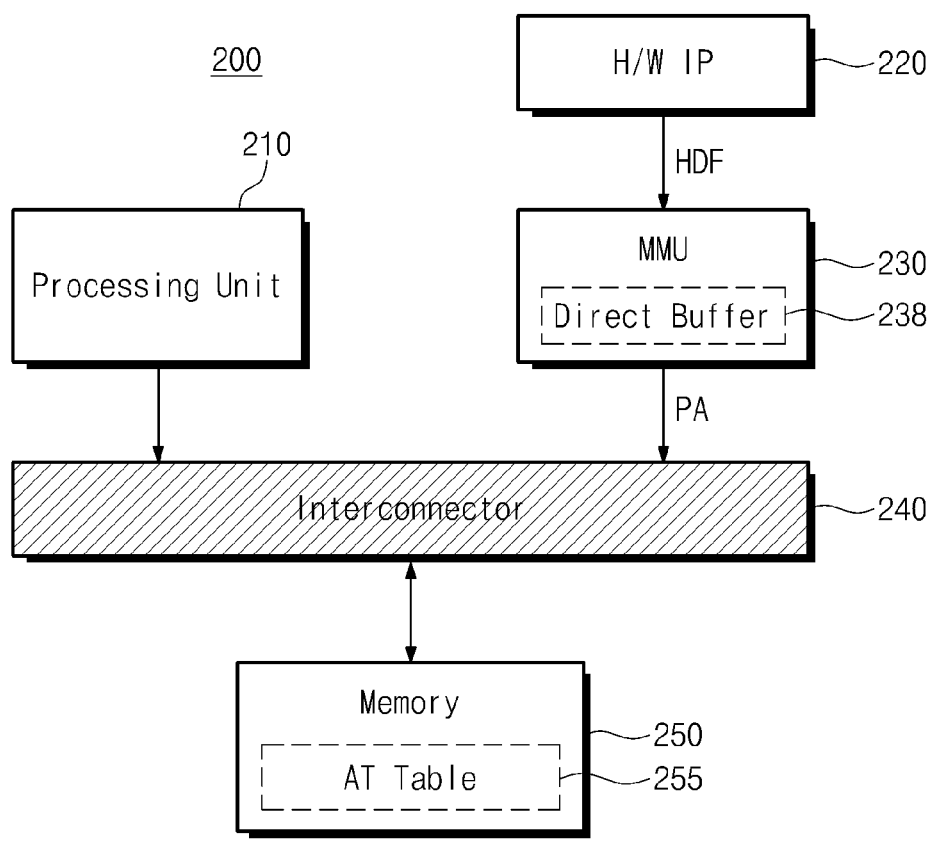
FIG. 14 is a block diagram of a system-on-chip according to another embodiment of the inventive concepts.

FIG. 14 is a block diagram of a system-on-chip 200 according to another embodiment of the inventive concepts. As illustrated, the system-on-chip 200 may include a processing unit 210, a hardware intellectual property (H/W IP) 220, a memory management unit (MMU) 230, an interconnector 240, and a memory 250. The memory 250 is a generic term for a memory resource such as a DRAM or an SRAM provided within or external to, the system-on-chip 200. The operation of the processing unit 210, the interconnector 240, and the memory 250 of the present embodiment are identical to those described in connection with FIG. 1 and will not be described in further detail in connection with the FIG. 14 embodiment. However, in the present embodiment, the hardware intellectual property 220 may be configured to directly control the memory management unit 230 to prefetch a page descriptor in a specific virtual memory area. This operation will be described below in detail.

The hardware intellectual property 220 transfers a direct fetch request HDF for a specific virtual memory area to the memory management unit 230 before issuing a request for access to the memory 250. In some embodiments, the direct fetch request HDF can include address information of page descriptors that the memory management unit 230 reads from an address translation table (AT Table) 255 of the memory 250. The transfer of the direct fetch request HDF may be performed through a command or by providing a control signal for setting a control register. Alternatively, page descriptors of a specific virtual address may be requested to be fetched using an existing interface. Hereinafter, a direct fetch request HDF issued from the hardware intellectual property block 220 will be referred to as a hardware direct fetch request HDF.

The memory management unit 230 reads requested page descriptors from the memory 250 in response to the hardware direct fetch request HDF. The memory management unit 230 stores the read page descriptors in a direct buffer 238 included therein. When the fetch to the direct buffer 238 is completed, the memory management unit 230 may transfer completion information DF_Complete on a corresponding command to the hardware intellectual property block 220.

The page descriptors fetched by the hardware direct fetch request HDF correspond to a virtual address where "Miss" is expected to occur, or likely to occur, during an address prefetch operation according to predetermined data traffic. Thus, the hardware intellectual property 220 may assure a "Hit" with respect to an unavoidable discontinuous address area by utilizing the hardware direct fetch request HDF, even during a prefetch operation.

Figure 15:
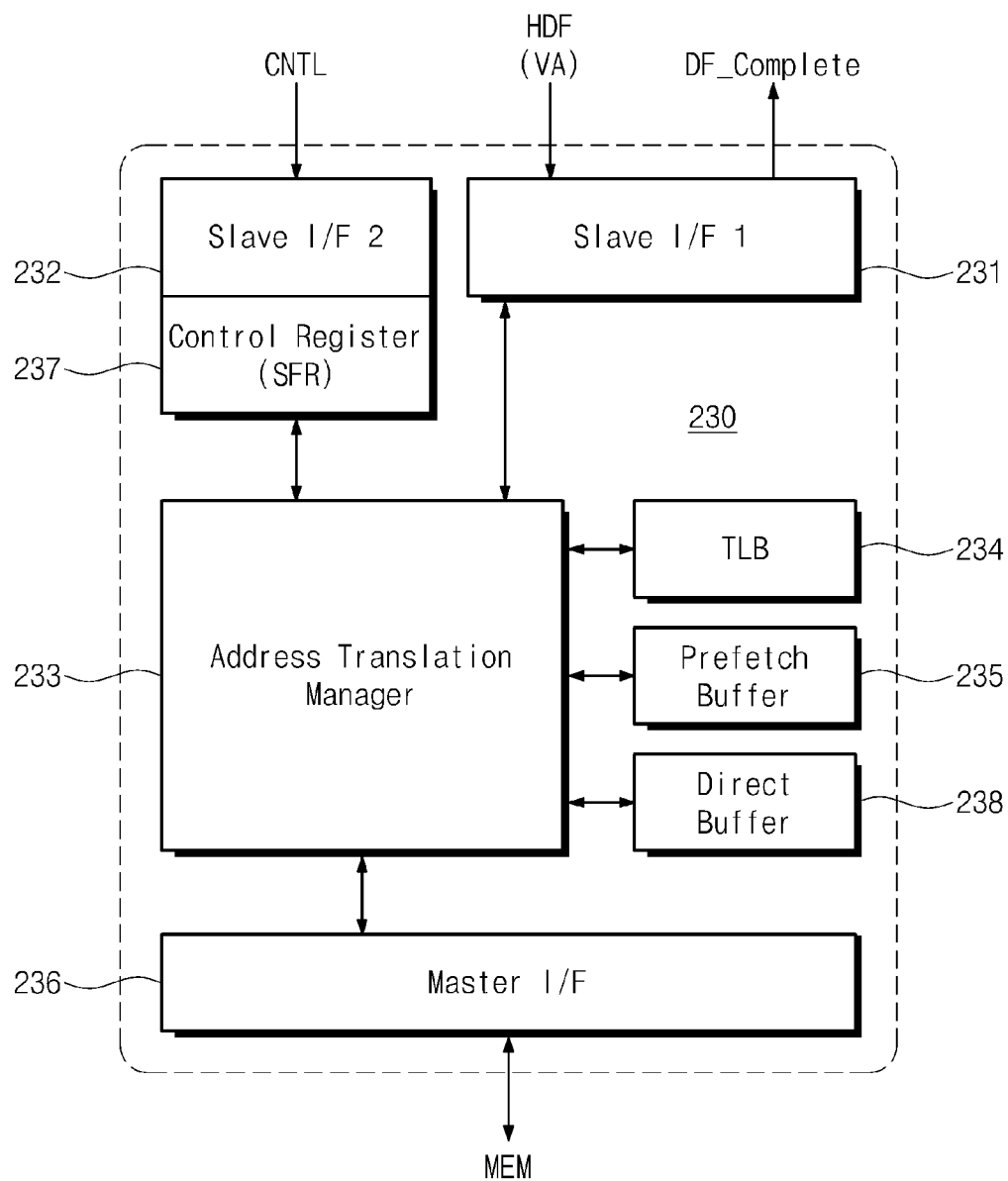
FIG. 15 is a block diagram showing the configuration of a memory management unit in FIG. 14.

FIG. 15 is a block diagram showing the configuration of the memory management unit 230 in FIG. 14. As illustrated, the memory management unit 230 includes slave interfaces (Slave I/F1 and Slave I/F2) 231 and 232, a master interface (Master I/F) 236, an address translation manager 233, a translation lookaside buffer (TLB) 234, a prefetch buffer 235, a control register 237, and a direct buffer 238. In response to the hardware direct fetch request HDF, the memory management unit 230 reads a page descriptor located in a requested virtual address area from the memory 250 and stores the read page descriptor in the direct buffer 238. When the transfer is complete, the memory management unit 230 resends complete information DF_Complete to the hardware intellectual property 230. The operation of the slave interfaces 231 and 232, the master interface 236, the prefetch buffer 235, and the control register 237 in the embodiment of FIG. 15 are substantially similar to those described in FIG. 3 and therefore will not be described in further detail.

In some embodiments, the hardware direct fetch request HDF may be provided from the hardware intellectual property 220 through the first slave interface 231. In some embodiments, the hardware direct fetch request HDF may include virtual address information for those page descriptors that should be read immediately. For example, the virtual address information may be provided through a read address channel AR. Communication with the hardware intellection property 220 and the memory management unit 230 may be provided to an included interface by a user. Alternatively, the communication with the hardware intellectual property 220 and the memory management unit 230 may be done through a read/write transaction of the AMBA protocol. That is, the hardware intellectual property 220 may provide the hardware direct fetch request HDF to the memory management unit 230 through the read address channel AR. On the contrary, the memory management unit 230 may transfer completion information DF_Complete to the hardware intellectual property 220 through a read data channel R after completing the hardware direct fetch request HDF. In other embodiments, it will be understood that the communication with the hardware intellectual property 220 and the memory management unit 230 may be performed for example, through a write address channel AW and a response channel B, or may be performed using other approaches.

The address translation manager 233 may access the address translation table 255 of the memory 250 (FIG. 14) in response to the hardware direct fetch request HDF. Then, the address translation manager 233 reads a page descriptor corresponding to the address information included in the hardware direct fetch request HDF. The read page descriptor may be stored in the direct buffer 238. The address translation manager 233 may send a completion signal DF_Complete to the hardware intellectual property 220 after storing directly fetch-requested page descriptors in the direct buffer 238.

In some embodiments, the direct buffer 238 may comprise a buffer memory that is separate from the translation lookaside buffer 234 and the prefetch buffer 235. In other embodiments, the direct buffer 238 may comprise memory segments borrowed from the prefetch buffer 238. In some embodiments, the look-up priority of the direct buffer 238 is configured to be lower than that of the translation lookaside buffer 234 and the prefetch buffer 235. That is, the look-up priority of a buffer memory for translating an input virtual address VA may be as follows: the translation lookaside buffer 234→the prefetch buffer 235→the direct buffer 238.

As described herein, it will be understood that through the operation of the translation lookaside buffer 234, the prefetch buffer 235, and the direct buffer 238, the system hit rate may be improved during a memory access operation in which a specific address pattern is repeated. The hardware direct fetch request HDF issued by the hardware intellectual property 220 may be provided by way of multiple commands. In some embodiments, a hardware direct fetch request HDF for two or more virtual addresses may be provided at the same time. In this case, direct buffers DB respectively corresponding to the hardware direct fetch requests HDF should be provided.

Figure 16:
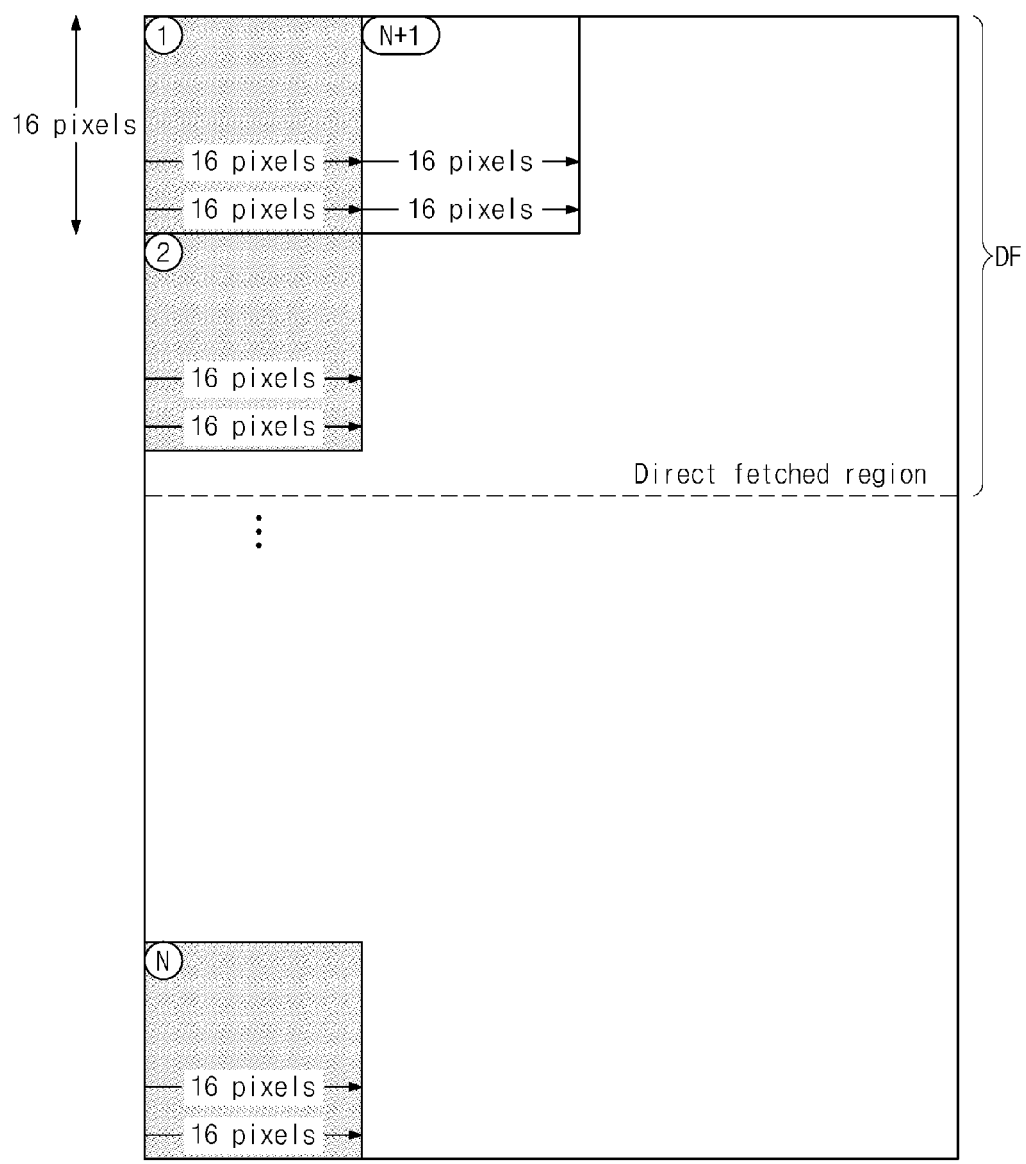
FIG. 16 illustrates an example of using a direct fetch method according to the inventive concepts.

FIG. 16 illustrates an example of using a direct fetch method according to the inventive concepts. Referring to FIG. 16, there is shown a memory region in which a hardware intellectual property 220 responsible for rotating an image issues a hardware direct fetch request HDF.

Along the vertical axis, data may be written into a memory in the order of shown sub-blocks (1→2→3→4→ . . . →N) to write data of each sub-block unit into a frame buffer. During a write operation into the sub-blocks (1→2→3→4→ . . . →N), a "Hit" may be assured through a prefetch operation. However, the hardware intellectual property 220 operates not in an increased direction of prefetch pattern but in a decreased direction of the prefetch pattern to access an $(N+1)^{th}$ sub-block. Accordingly, a "Miss" may occur in the prefetch buffer 235. The hardware intellectual property 220 may assure a "Hit" through a hardware direct fetch request HDF with respect to a sub-block corresponding to a boundary point of an image together with a prefetch operation based on this decreased direction of the prefetch pattern.

The hardware intellectual property 220 may control a shown direct fetched region to be stored in the direct buffer 238 of the memory management unit 230 through the hardware direct fetch request HDF in advance. When "Miss" occurs in the prefetch buffer 235 afterwards, the direct buffer 238 may be referenced to be "Hit".

Figure 17:
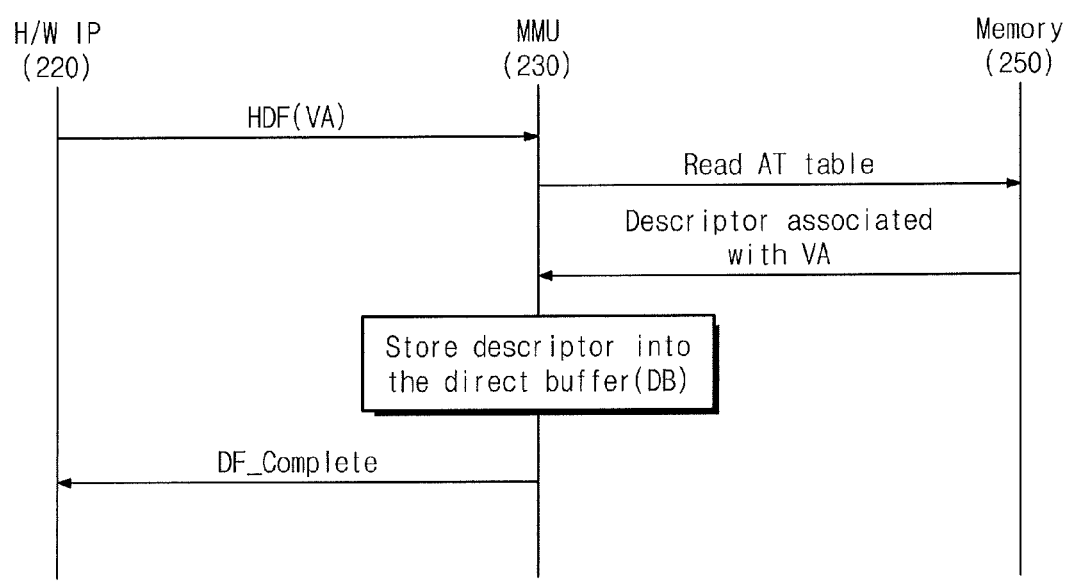
FIG. 17 illustrates a procedure of communication between hardware components for performing a direct fetch operation according to the inventive concepts.

FIG. 17 illustrates a procedure of communication between hardware components for performing a direct fetch operation according to the inventive concepts. Referring to FIG. 17, procedures of communication between a hardware intellectual property (H/W IP) 220 and a memory management unit (MMU) 230 and communication between the hardware intellectual property 220 and a memory 250 will be sequentially described.

The hardware intellectual property 220 provides, to the memory management unit 230, a hardware direct fetch request HDF for an area in which "Miss" is expected to occur in a prefetch buffer 235 such as the above-mentioned boundary area of an image, as illustrated in FIG. 16. In response to the hardware direct fetch request HDF, the memory management unit 230 requests a memory 250 to read a requested page descriptor. The memory 250 may provide a page descriptor included in an address translation table to the memory management unit 230. The page descriptor received from the memory 250 is stored in a direct buffer 238 (see FIG. 15) of the memory management unit 230.

When the page descriptor requested by the hardware direct fetch request HDF has been successfully stored in the direct buffer 238, the memory management unit 230 may transfer a completion signal DF_Complete to the hardware intellectual property 220.

Figure 18:
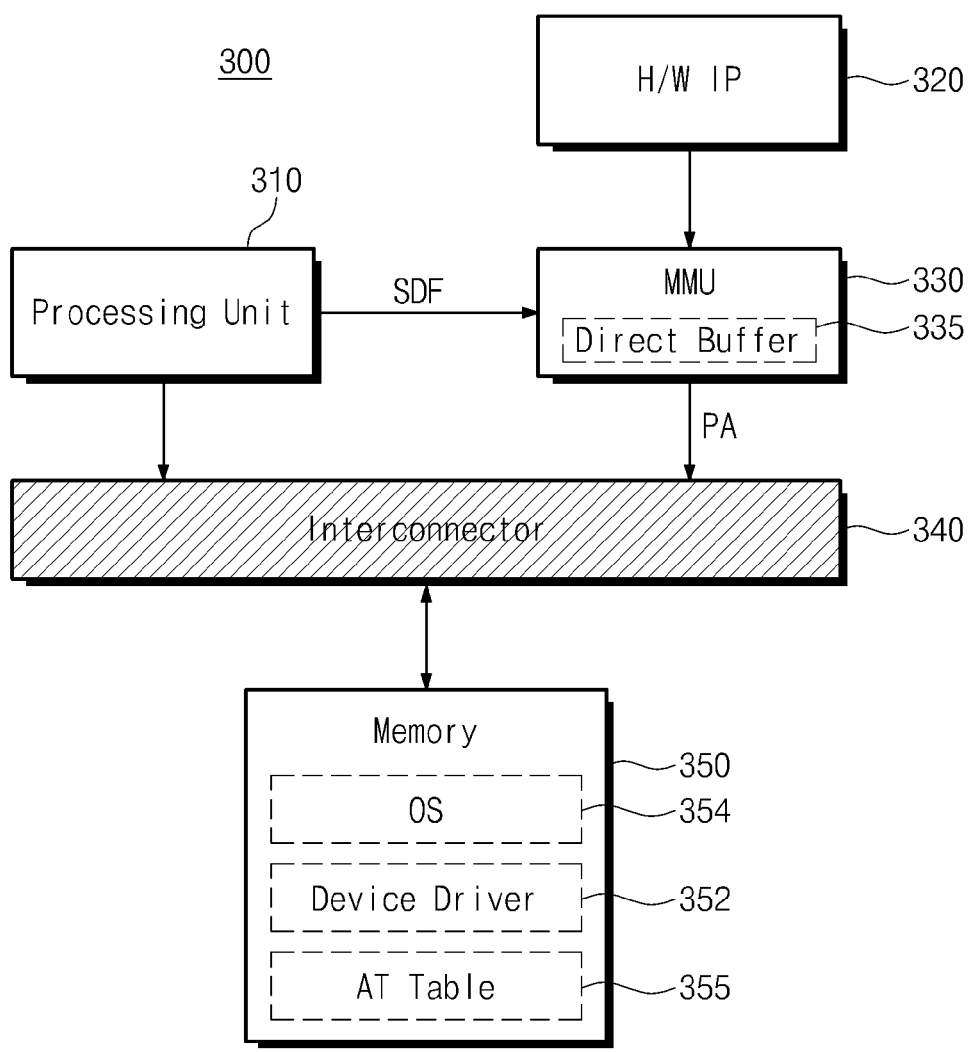
FIG. 18 is a block diagram of a system-on-chip according to yet another embodiment of the inventive concepts.

FIG. 18 is a block diagram of a system-on-chip 300 according to another embodiment of the inventive concepts. As illustrated, the system-on-chip 300 may include a processing unit 310, a hardware intellectual property (H/W IP) 320, a memory management unit (MMU) 330, an interconnector 340, and a memory 350. The memory 350 is a generic term of a memory resource such as a DRAM or an SRAM provided within or external to the system-on-chip 300. The operations of the processing unit 310, the hardware intellectual property 320, the memory management unit 330, the interconnector 340, and the memory 350 are substantially similar to those described in the embodiment of FIG. 14 and will not be described in further detail. The processing unit 310 may operate to control a direct fetch operation of the memory management unit 330 through a software direct fetch request SDF.

When a mobile device is powered up, in some systems, an operating system (OS) 354, a device driver 352, etc. are loaded to the memory 350 from a nonvolatile storage medium. An address translation table 355 is formed on the memory 350. Although not shown, an application program or various types of user data may also be loaded to the memory 350. In this case, the processing unit 310 may operate according to a sequence defined by the application program, the operating system 354, and the device driver 352 loaded to the memory 350.

The device driver 352 is a program to support the operation of the hardware intellectual property 320 in a software layer. In particular, the device driver 352 may control the processing unit 310 to issue a software direct fetch SDF request including start address information of a frame buffer between frames immediately after a virtual address is assigned. That is, the software direct fetch request SDF may be provided to the memory management unit 330 by the processing unit 310. Since the device driver 352 or the processing unit 320 controlling the hardware intellectual property 320 already may have the overall information on a start address of a frame or virtual address mapping, the software direct fetch request SDF may be dropped. That is, a command issued by the processing unit 310 to make preparation for the hardware direct fetch request HDF issued by the hardware intellectual property 320 may be referred to as a software direct fetch request SDF in the sense that it is issued by software.

In response to the software direct fetch request SDF, the memory management unit 330 may fetch page descriptors of a corresponding address from an address translation table (AT Table) 355 of the memory 350 and store the fetched page descriptors in the direct buffer 338 in advance. Thereafter, an access command may be issued to a frame buffer from the hardware intellectual property 320. Since a descriptor for initial addresses of a frame is already fetched to the direct buffer 338, a "Hit" may be assured with respect to a first address of each frame. During fetching with respect to subsequent addresses for respective frames, a "Hit" occurrence may be assured by the prefetch buffer. In addition, a "Hit" with respect to a discontinuous point of a virtual address corresponding to a boundary point at the frame may be resolved by the hardware direct fetch request HDF, as described herein.

In order to assure a "Hit" occurs with respect to a start address of a frame, software direct fetch (SDF) commands or requests for a plurality of frame start addresses may constitute a command queue in the memory management unit 320. Thus, a page descriptor for start addresses respectively corresponding to frames to be issued by the command queue may be stored in the direct buffer 338 without delay.

As a result, the page descriptor corresponding to start addresses of frames is stored in advance in the direct buffer 338 by the software direct fetch command or request SDF. In addition, "Hit" with respect to a virtual memory area corresponding to a boundary portion of an image in a single frame may be assured by the hardware direct fetch command or request HDF, and a "Hit" occurrence with respect to a continuous access request may be assured by a prefetch operation.

Figure 19:
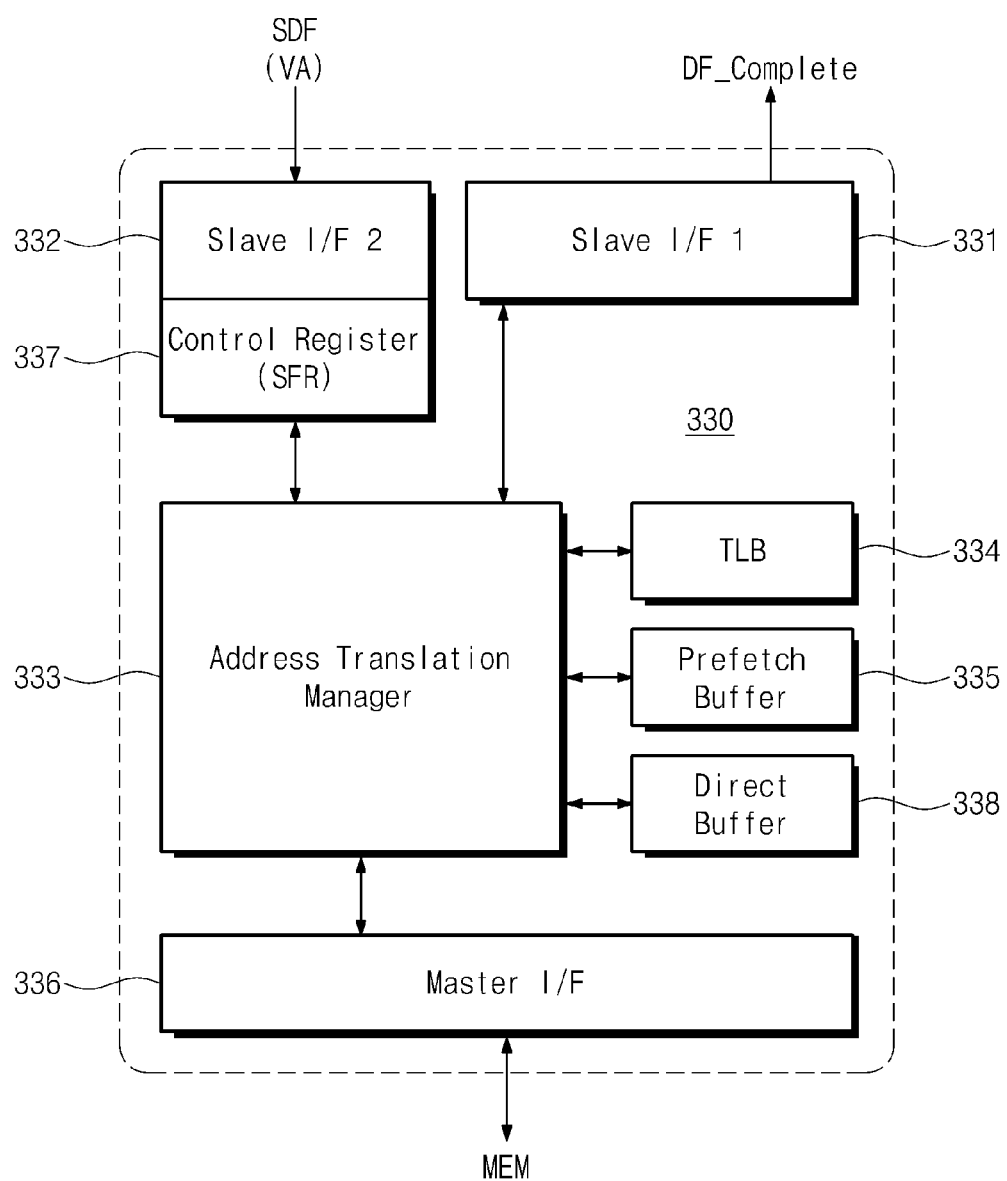
FIG. 19 is a block diagram showing the configuration of a memory management unit in FIG. 18.

FIG. 19 is a block diagram showing the configuration of the memory management unit 330 in FIG. 18. As illustrated, the memory management unit 330 includes slave interfaces (Slave I/F1 and Slave I/F2) 331 and 332, a master interface 336 (Master I/F) 336, an address translation manager 333, a translation lookaside buffer (TLB) 334, a prefetch buffer 335, a control register 337, and a direct buffer 338. In response to direct fetch requests HDF and SDF, the memory management unit 330 reads a page descriptor of a requested virtual address area from a memory 350 and stores the read page descriptor in the direct buffer 338. The slave interfaces 331 and 332, the master interface 336, the prefetch buffer 335, and the control register 337 are similar in operation to those described in connection with FIG. 15 and will not described in further detail.

In the present embodiments, the hardware direct fetch request HDF may be provided to the memory management unit 330 from the hardware intellectual property 320 through the first slave interface 331. The software direct fetch request SDF may be provided to the memory management unit 330 from the processing unit 310 through the second slave interface 332.

The address translation manager 333 may look up a page descriptor in the translation lookaside buffer 334 in response to the software direct fetch request SDF. When a page descriptor requested by the software direct fetch request SDF is present in the translation lookaside buffer 334, the address translation manager 333 may cancel access to the memory 350, in which case the address translation manager 333 looks up the page descriptor in the translation lookaside buffer 334. Page descriptors looked up in the translation lookaside buffer 334 may be continuously maintained because their update may be blocked.

When a page descriptor requested by the software direct fetch request SDF is not present in the translation lookaside buffer 334, the address translation manager 333 may read a corresponding page descriptor from the memory 350. The address translation manager 333 may store the read page descriptor in the direct buffer 338 and copy the read page descriptor to the translation lookaside buffer 334. In addition, the address translation manager 333 may lock the page descriptor copied to the translation lookaside buffer 334. Page descriptors locked in the translation lookaside buffer 334 may be continuously maintained because their update is blocked.

There has been described herein a configuration of the memory management unit 330 that fetches a page descriptor of a start address of a corresponding frame before a traffic thread is issued according to a software direct fetch request SDF. In some embodiments, the memory management unit 330 stores a descriptor requested by the software direct fetch request SDF in the direct buffer 338 and updates the requested page descriptor to the translation lookaside buffer 334. In addition, a page descriptor corresponding to a start address of a frame updated to the translation lookaside buffer 334 may be locked to be protected.

Figure 20:
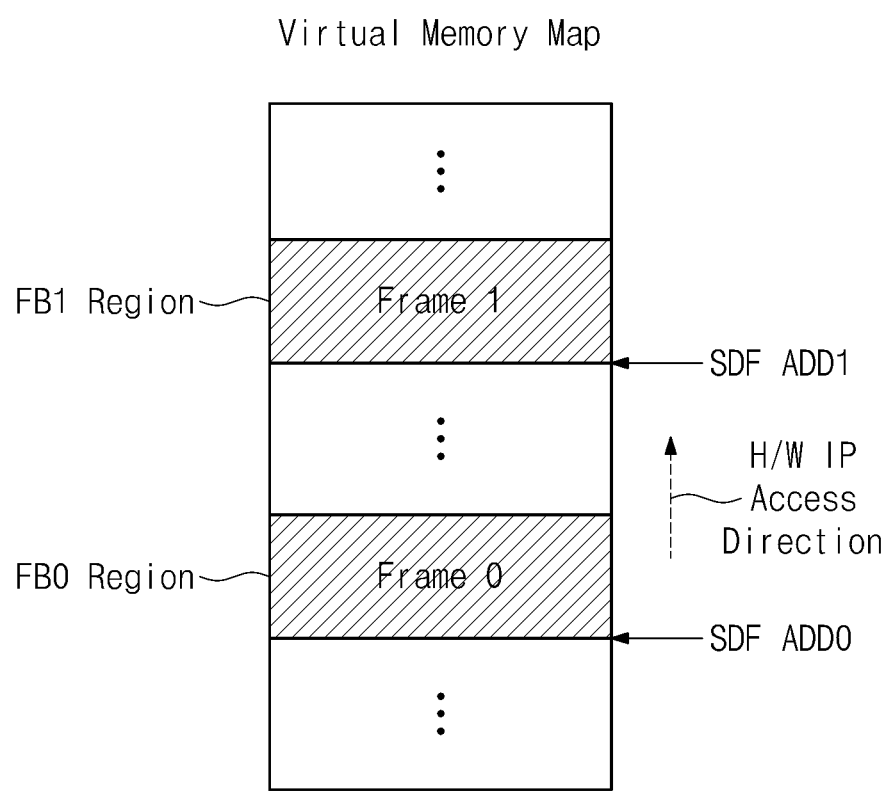
FIG. 20 is a memory map showing a position of a fetch-requested virtual address through a software direct fetch (SDF) according to the inventive concepts.

FIG. 20 is a memory map showing a position of a fetch-requested virtual address through a software direct fetch (SDF) according to the inventive concepts. Referring to FIG. 20, for example, two frame buffer regions are assigned to a virtual memory. A start address SDF ADD0 of a frame buffer FB0 and a start address SDF ADD1 of a frame buffer FB1 are provided to the memory management unit 330 by the software direct fetch request SDF. Page descriptors corresponding to the start addresses SDF ADD0 and SDF ADD1 may be fetched by the memory management unit 330 and may be updated to the direct buffer 338 and the translation lookaside buffer 334.

By the software direct fetch request SDF, a "Hit" occurrence with respect to the start addresses SDF ADD0 and SDF ADD1 of the frame buffers FB0 and FB1 may be assured. In addition, a "Hit" occurrence with respect to a virtual address subsequent to the start addresses SDF ADD0 and SDF ADD1 may be assured by the prefetch buffer 335. Within a single frame, a "Hit" occurrence with respect to a discontinuous point of a virtual address may be assured by the hardware direct fetch request HDF.

Figure 21:
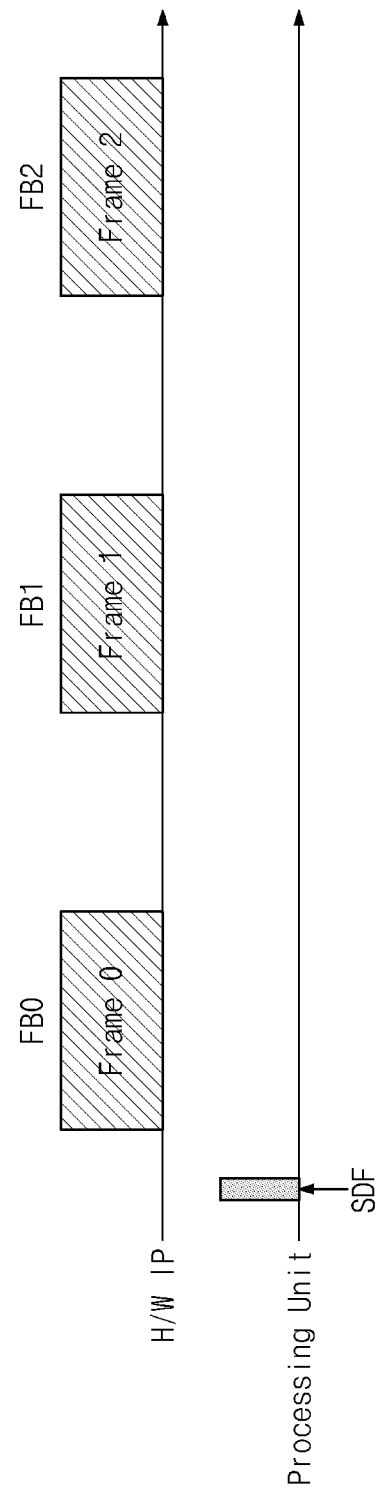
FIG. 21 is a timing diagram showing an issue point of a software direct fetch (SDF) request.

FIG. 21 is a timing diagram showing an issue point of a software direct fetch (SDF), in accordance with the present inventive concepts. Frames Frame0, Frame1, and Frame2 to be sequentially requested to be provided to the memory management unit 330 by the hardware intellectual property 320 are shown in FIG. 21. Before access to the frames Frame0, Frame1, and Frame2 is requested, the software direct fetch request SDF may be issued to fetch a start address for the frames Frame0, Frame1, and Frame2 in advance. The software direct fetch request SDF may be stored in a command queue with respect to a plurality of start commands.

Figure 22:
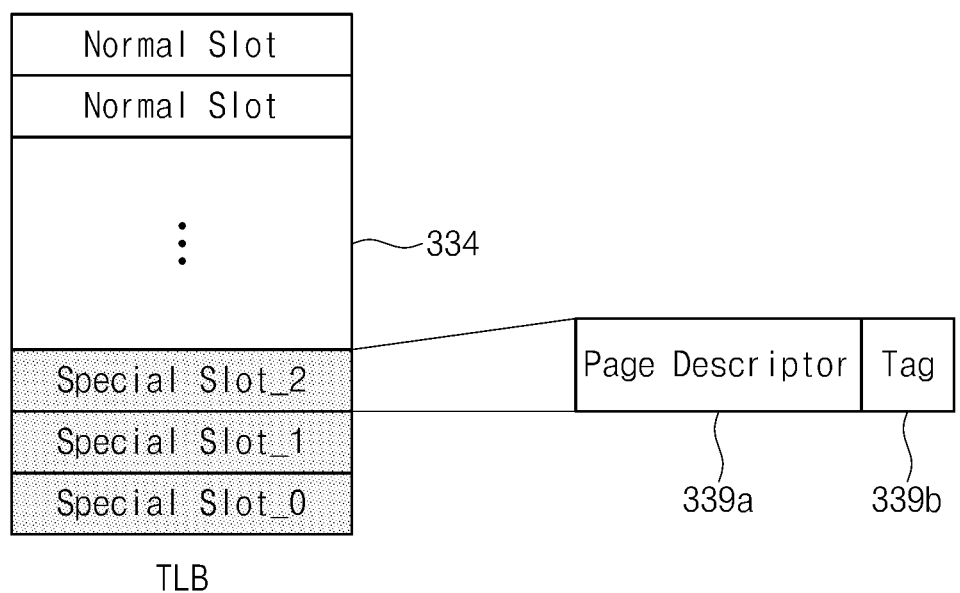
FIG. 22 illustrates a translation lookaside buffer associated with a software direct fetch (SDF) request.

FIG. 22 illustrates a translation lookaside buffer associated with a software direct fetch (SDF) request. A virtual address requested by a software direct fetch request SDF is cached to the translation lookaside buffer 334 and locked.

Among page descriptors cached to the translation lookaside buffer 334, several page descriptors may be updated by a software direct fetch request SDF according to the inventive concepts. Referring to FIG. 22, a page descriptor cached by the software direct fetch request SDF may be designed as a special slot, while page descriptors referenced from the prefetch buffer 335 to be updated according to locality may be designated as a normal slot.

In some embodiments, the page descriptor designated as a special slot is locked. That is, a locked page descriptor may not be updated even during various operation processings requested by the hardware intellectual property 320. When "Hit" does not occur in the locked page descriptor for a specific time, the locked page descriptor may be erased in the translation lookaside buffer 334 after being designated as a normal slot by the address translation manager 333.

Each slot defined by the translation lookaside buffer 334 may have a field for distinguishing between a special slot and a normal slot. That is, each slot may have a page descriptor field 339*a* for address translation and a tag field 339*b* for marking whether a slot is locked. The address translation manager 333 marks a page descriptor fetched by the software direct fetch request SDF from the processing unit 310 as a special slot in the tag field 339b. A page descriptor designated as a special slot may be excluded in a replacement policy of the translation lookaside buffer 334. Thus, entries designated with a special slot cannot be erased by a request of the hardware intellectual property 320.

Figure 23:
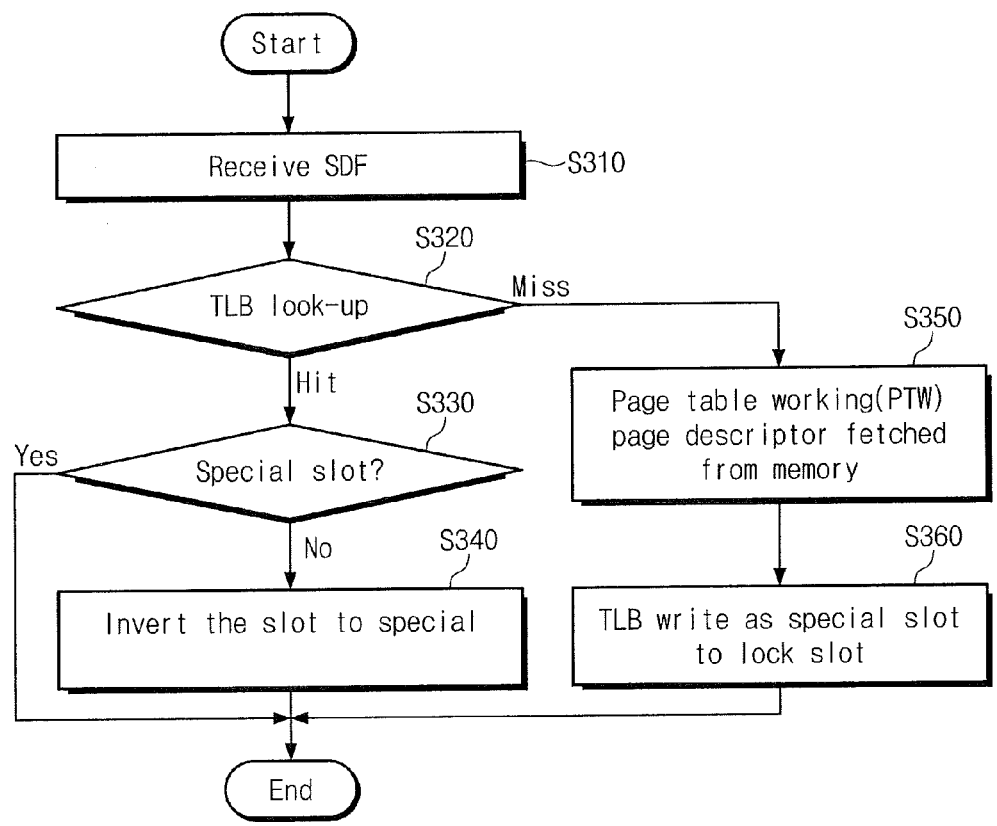
FIG. 23 is a flowchart illustrating a software direct fetch operation according to the inventive concepts.

FIG. 23 is a flowchart illustrating a software direct fetch operation according to the inventive concepts. Referring to FIG. 23, the memory management unit 330 caches page descriptors corresponding to a start address of a frame before a traffic thread or request is issued from the hardware intellectual property 320 in response to a software direct fetch request SDF. Page descriptors cached by the software direct fetch request SDF are locked in the translation lookaside buffer 334 to block erasure of a corresponding entry. This operation will be described below in detail.

In operation S310, the memory management unit 330 receives a software direct fetch request SDF provided from the processing unit 310. The software direct fetch request SDF may be requested in a device driver of a software layer for supporting the hardware intellectual property 320 and may be provided to the memory management unit 330 by the processing unit 310. Page descriptors requested by the software direct fetch request SDF may correspond to a start address of frame buffers. This is because a page descriptor for a start address of a frame may be fetched in advance to block the occurrence of an "Initial Miss" with respect to a single frame. The software direct fetch request SDF may optionally be transferred to the memory management unit 330.

In operation S320, the address translation manager 333 of the memory management unit 330 performs a look-up operation to determine whether a page descriptor of a received virtual address VA is already present in the translation lookaside buffer 334. When a page descriptor corresponding to an access-requested virtual address VA is present in the translation lookaside buffer 334 (Hit), the flow proceeds to operation S330. Meanwhile, when no page descriptor corresponding to an access-requested virtual address VA is present in the translation lookaside buffer 334 (Miss), the flow proceeds to operation S350.

In operation S330, the address translation manager 333 detects whether the page descriptor cached to the translation lookaside buffer 334 is already marked as a special slot. When the cached page descriptor is already marked as the special slot (Yes direction), a setting operation of the translation lookaside buffer 334 according to the software direct fetch request may be terminated. However, when the cached page descriptor is marked as a normal slot (No direction), the flow proceeds to operation S340 to invert the slot to special and lock the slot.

In operation S340, the address translation manager 333 locks the page descriptor maintained as a normal slot although the page descriptor is loaded to the translation lookaside buffer 334 by the software direct fetch request SDF. That is, the address translation manager 333 translates or inverts a corresponding page descriptor to a special slot. The page descriptor designated as the special slot is protected without being erased even during various operation processings requested by the hardware intellectual property 320.

In operation S350, since the page descriptor requested by the software direct fetch request SFD is not present in the translation lookaside buffer 340, a page descriptor may be fetched from the memory 350. Alternatively, although not shown in the figure, the prefetch buffer 335 or the direct buffer 338 having lower lookup priority than the translation lookaside buffer 340 may be searched or looked up. In a general case, page descriptors corresponding to a start address of a frame buffer may be fetched by accessing the memory 350. This operation corresponds to a page table working (PTW). The fetched page descriptors may be loaded to the translation lookaside buffer 334.

In operation S360, an entry of the page descriptors loaded to the translation lookaside buffer 334 is locked. That is, the page descriptors loaded to the translation lookaside buffer 334 by the software direct fetch request SDF may be designated as a special slot to be protected from an injudicious erase operation.

There has been described a locking operation in the translation lookaside buffer 334 according to the providing of a software direct fetch request SDF. As a start address of a specific frame buffer is maintained in the translation lookaside buffer 334 through locking, the occurrence of an "Initial Miss" may be avoided during a memory access operation to frames.

Figure 24:
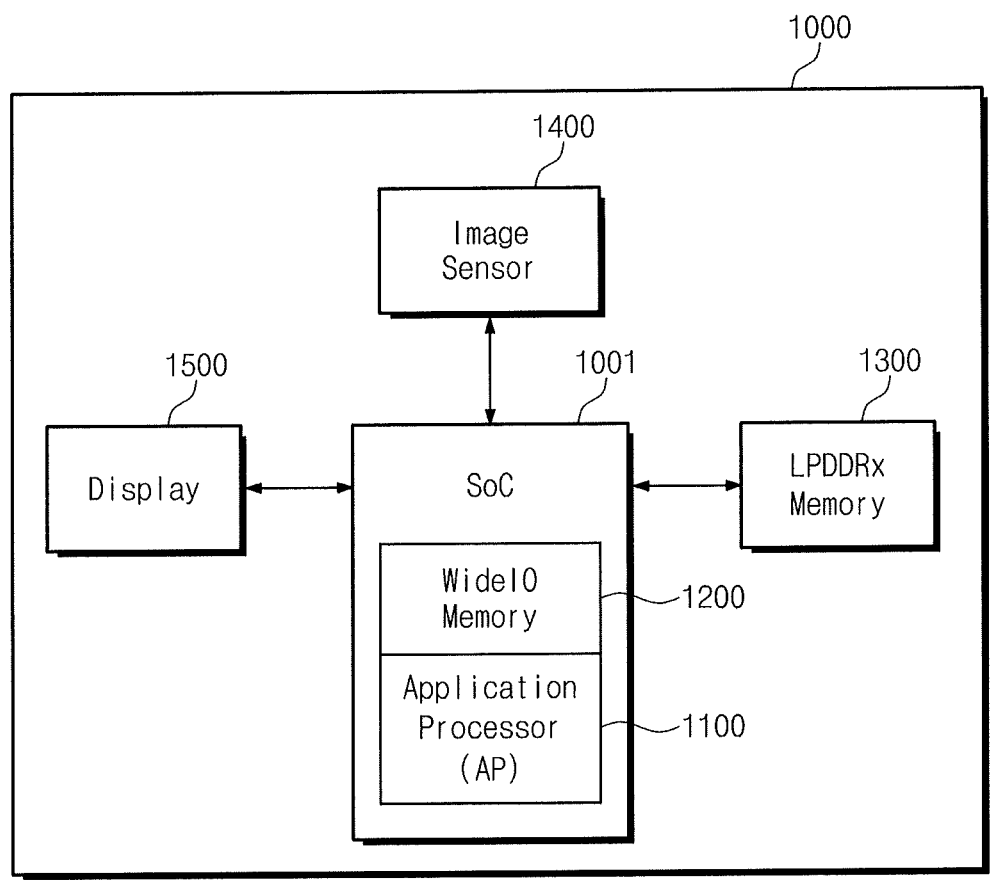
FIG. 24 is a block diagram of a mobile device including a system-on-chip according to an embodiment of the inventive concepts.

FIG. 24 is a block diagram of a mobile device 1000 including a system-on-chip according to an embodiment of the inventive concepts. As illustrated, the mobile device 1000 may include a system-on-chip 1001, an LPDDRx memory device 1300, an image sensor 1400, and a display 1500. Data stored in a WideIO memory 1200 or the LPDDRx memory 1300 may be displayed on the display 1500 under the control of the system-on-chip 1001. The system-on-chip 1001, especially, an application processor (AP) 1100 may include a memory management unit (MMU), a processing unit, a hardware intellectual property (H/W IP), and an interconnector, which have been described in the foregoing embodiments of the inventive concepts. Thus, the system-on-chip 1001 may provide a high address translation hit rate to a real-time requested traffic thread where latency is a significant performance element.

A system-on-chip (Soc) and a semiconductor device according to the inventive concepts may be packaged as one of various types to be subsequently embedded. For example, a system-on-chip (SoC) according to the inventive concepts may be packaged by one of PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline Integrated Circuit (SOIC), Shrink Small Outline Package (SSOP), Thin Small Outline Package (TSOP), Thin Quad Flatpack (TQFP), System In Package (SIP), Multi Chip Package (MCP), Wafer-level Fabricated Package (WFP), and Wafer-level Stack Package (WSP).

As described herein, a page descriptor can be stored in advance in a memory management unit (MMU) under various conditions where an address translation overhead is expected. In this manner, address translation overhead that may otherwise occur during access to a virtual memory can be significantly reduced.

While the inventive concepts have been particularly shown and described with reference to exemplary embodiments thereof, it will be apparent to those of ordinary skill in the art that various changes in form and detail may be made therein without departing from the spirit and scope of the inventive concepts, which is defined by the following claims.

We claim:

1. A method of translating a virtual address to a physical address in a memory management unit comprising:

receiving a memory access request as a virtual address and an access direction information;

determining whether a page descriptor corresponding to the virtual address is present in a translation lookaside buffer, the translation lookaside buffer having stored therein page descriptors of a plurality of physical addresses; and in the event the page descriptor corresponding to the virtual address is not present in the translation lookaside buffer, further:

determining whether the page descriptor corresponding to the virtual address is present in a prefetch buffer, the prefetch buffer being in the memory management unit and having stored therein page descriptors of a plurality of physical addresses; and in the event the page descriptor corresponding to the virtual address is not present in the prefetch buffer, further:

updating the prefetch buffer with the page descriptor corresponding to the virtual address from an external memory;

performing a translation of the virtual address to a physical address using the page descriptor corresponding to the virtual address from the external memory; and updating the translation lookaside buffer with the page descriptor corresponding to the virtual address from the external memory, wherein the access direction information is provided to the memory management unit as information on an increased or decreased direction of the virtual address for updating the prefetch buffer, and wherein determining whether the page descriptor corresponding to the virtual address is present in the prefetch buffer is performed by:

receiving prefetch buffer matching information (PBMI) including the access direction information;

storing the PBMI at a control register in the memory management unit;

receiving the memory access request, the memory access request including input matching information and the virtual address;

comparing the PBMI to the input matching information of the memory access request;

in the event the comparing results are a match, retrieving the page descriptor corresponding to the received virtual address from the prefetch buffer in the memory management unit;

in the event the comparing results in no match, retrieving the page descriptor corresponding to the received virtual address from the external memory; and translating the received virtual address to a physical address using the retrieved page descriptor.

2. The method of claim 1 wherein the prefetch buffer comprises first and second sub-prefetch buffers, and wherein an access of one of the first and second prefetch buffers occurs while an update of another of the first and second prefetch buffers is performed.

3. The method of claim 1 wherein receiving the memory access request comprises receiving the memory access request from one of a plurality of memory access traffic threads.

4. The method of claim 1 wherein the control register comprises multiple control registers and the prefetch buffer comprises multiple prefetch buffers, and wherein comparing the PBMI to the input matching information of the memory access request comprises comparing the input matching information to the multiple control registers to determine which of the multiple prefetch buffers to access.

5. The method of claim 4 wherein the multiple prefetch buffers are bundled into logic units, which logic units can be accessed for access requests corresponding to different access traffic rates.

6. The method of claim 1 further comprising locking a page descriptor corresponding to a predefined process in the translation lookaside buffer.

7. The method of claim 6 wherein the predefined process comprises a software direct fetch (SDF) request.

8. The method of claim 1 further comprising, following the updating of the prefetch buffer, forwarding a signal indicating completion of the updating of the prefetch buffer to a unit that generated the memory access request.

9. The method of claim 1 wherein updating the prefetch buffer comprises updating the prefetch buffer based on the access direction information, the access direction information being received from a processing unit in communication with the memory management unit.

10. An application processor comprising:
a processing unit;
a hardware intellectual property (IP) unit that issues memory access requests as virtual addresses;
a memory management unit in communication with the processing unit, the memory management unit comprising:
an address translation unit that receives a memory access request from the hardware IP unit as a virtual address and translates the received virtual address to a physical address;
a translation lookaside buffer that stores page descriptors of a plurality of physical addresses, the address translation unit determining whether a page descriptor corresponding to the received virtual address is present in the translation lookaside buffer; and
a prefetch buffer that stores page descriptors of a plurality of physical addresses, the address translation unit updating the prefetch buffer based on at least one of first access direction information and second access direction information,
wherein the first access direction information is prefetch buffer matching information received from the processing unit;
wherein the second access direction information is prefetch buffer matching information received from the hardware IP unit; and
wherein the first access direction information is provided to the address translation unit when an increased or decreased direction of a virtual address to be access-requested is random, and the second access direction information is provided to the address translation unit when the increased or decreased direction of a virtual address to be access-requested is constant.

11. The application processor of claim 10 wherein the address translation unit, in the event the page descriptor corresponding to the received virtual address is not present in the translation lookaside buffer, further:

determines whether the page descriptor corresponding to the received virtual address is present in the prefetch buffer;

performs a prefetch operation to prefetch, from a memory device external to the application processor, the page descriptor corresponding to the received virtual address when determined to be not present in the prefetch buffer in response to at least one of the first and second access direction information received from the processing unit and the hardware IP unit, respectively; and performs a translation of the received virtual address to a physical address using the page descriptor corresponding to the received virtual address from the prefetch buffer or when the received virtual address is not present in the prefetch buffer, from the memory device external to the application processor.

12. The application processor of claim 11 wherein the address translation unit further updates the translation lookaside buffer with the page descriptor corresponding to the received virtual address.

13. The application processor of claim 11 wherein the prefetch operation is performed in response to a fetch request received from the processing unit, the fetch request including at least one of a page descriptor corresponding to the received virtual address or the received virtual address.

14. The application processor of claim 11 wherein the prefetch operation is performed in response to a fetch request received from the Hardware IP unit, the fetch request including at least one of a page descriptor corresponding to the received virtual address or the received virtual address.

15. The application processor of claim 11 further comprising a direct buffer that stores page descriptors of a plurality of physical addresses, wherein the address translation unit further receives a direct fetch request, and in response, fetches at least one page descriptor associated with a received virtual address and stores the at least one page descriptor in the direct buffer.

16. The application processor of claim 15 wherein the direct fetch request is received from the Hardware IP unit in communication with the memory management unit.

17. The application processor of claim 15 wherein the direct fetch request is received from the processing unit in communication with the memory management unit.

18. The application processor of claim 15 wherein the direct fetch request is received and processed prior to the received memory access request.

19. A system on a chip comprising:

a processing unit;

a hardware intellectual property (IP) unit that issues memory access requests as virtual addresses;

a memory device;

a memory management unit in communication with the processing unit and the memory device, the memory management unit comprising:

an address translation unit that receives a memory access request from the hardware IP unit as a virtual address and translates the received virtual address to a physical address;

a translation lookaside buffer that stores page descriptors of a plurality of physical addresses, the address translation unit determining whether a page descriptor corresponding to the received virtual address is present in the translation lookaside buffer; and a prefetch buffer that stores page descriptors of a plurality of physical addresses, the address translation unit updating the prefetch buffer based on first access direction information or second access direction information, wherein the first access direction information is prefetch buffer matching information received from the processing unit;

wherein the second access direction information is prefetch buffer matching information received from the hardware IP unit, and wherein the first access direction information is provided to the address translation unit when an increased or decreased direction of a virtual address to be access-requested is random, and the second access direction information is provided to the address translation unit when the increased or decreased direction of a virtual address to be access-requested is constant.

* * * * *